(12) United States Patent
Chung

(10) Patent No.: US 9,002,258 B2
(45) Date of Patent: Apr. 7, 2015

(54) ADAPTABLE AUDIO INSTRUCTION SYSTEM AND METHOD

(76) Inventor: Dongju Chung, Forest Hills, NY (US)

( * ) Notice: Subject to any disclaimer, the term of this patent is extended or adjusted under 35 U.S.C. 154(b) by 1652 days.

(21) Appl. No.: 11/624,643

(22) Filed: Jan. 18, 2007

(65) Prior Publication Data

US 2007/0189128 A1 Aug. 16, 2007

Related U.S. Application Data

(60) Provisional application No. 60/760,226, filed on Jan. 18, 2006.

(51) Int. Cl.
| | | |
|---|---|---|
| G09B 5/04 | (2006.01) |
| G11B 27/34 | (2006.01) |
| H04N 21/258 | (2011.01) |
| G11B 27/10 | (2006.01) |
| G06F 3/16 | (2006.01) |
| G09B 7/02 | (2006.01) |
| G11B 27/22 | (2006.01) |

(52) U.S. Cl.
CPC .......... *G11B 27/34* (2013.01); *H04N 21/25891* (2013.01); *G11B 27/105* (2013.01); *G06F 3/167* (2013.01); *G09B 7/02* (2013.01); *G11B 27/22* (2013.01)

(58) Field of Classification Search
USPC ........................................................ 434/320
See application file for complete search history.

(56) References Cited

U.S. PATENT DOCUMENTS

| | | | |
|---|---|---|---|
| 3,996,671 A | 12/1976 | Foster | |
| 4,305,131 A * | 12/1981 | Best | 715/716 |
| 4,412,305 A * | 10/1983 | Yoshida | 704/4 |
| 4,489,396 A | 12/1984 | Hashimoto et al. | |
| 4,684,349 A | 8/1987 | Ferguson et al. | |
| 4,786,255 A * | 11/1988 | Hiramatsu et al. | 434/157 |
| 4,804,328 A | 2/1989 | Barrabee | |
| 4,812,126 A | 3/1989 | Gilliksen | |
| 5,180,307 A * | 1/1993 | Hiramatsu | 434/157 |
| 5,393,073 A * | 2/1995 | Best | 463/35 |
| 5,486,111 A * | 1/1996 | Watkins | 434/157 |
| 5,826,110 A | 10/1998 | Ozden et al. | |
| 6,341,958 B1 | 1/2002 | Zilberman | |
| 6,389,019 B1 | 5/2002 | Fan et al. | |
| 6,725,460 B1 | 4/2004 | Nishiyama et al. | |
| 6,874,161 B1 | 3/2005 | Wasserman et al. | |
| 6,907,616 B2 | 6/2005 | Yamauchi et al. | |
| 6,959,327 B1 | 10/2005 | Vogl et al. | |
| 7,524,191 B2 * | 4/2009 | Marmorstein et al. | 434/157 |
| 7,657,335 B2 * | 2/2010 | Sugiyama et al. | 700/94 |

(Continued)

OTHER PUBLICATIONS

Non-Final Office Action received in U.S. Appl. No. 13/413,540, dated May 15, 2012, 11 pages.

(Continued)

*Primary Examiner* — Xuan Thai
*Assistant Examiner* — Michael Grant
(74) *Attorney, Agent, or Firm* — Davis Wright Tremaine LLP; Michael J. Donohue; Heather M. Colburn

(57) ABSTRACT

An adaptable audio instruction system and method allows for tailoring and modification to audio sequences used for audio instruction of users. The tailoring and modification abilities of the system regard content and presentation details of the audio sequences to comply with user preferences and user progress in learning content contained in the audio sequences.

22 Claims, 29 Drawing Sheets

(56) References Cited

U.S. PATENT DOCUMENTS

| | | |
|---|---|---|
| 2002/0026521 A1 | 2/2002 | Sharfman et al. |
| 2002/0137012 A1 | 9/2002 | Hohl |
| 2002/0150869 A1 | 10/2002 | Shpiro |
| 2003/0128665 A1 | 7/2003 | Bernhard et al. |
| 2004/0019486 A1 | 1/2004 | Wen et al. |
| 2004/0032827 A1 | 2/2004 | Hill et al. |
| 2004/0170198 A1 | 9/2004 | Meggers et al. |
| 2004/0218617 A1 | 11/2004 | Sagfors |
| 2005/0026131 A1 | 2/2005 | Elzinga et al. |
| 2005/0183127 A1 | 8/2005 | Ngo et al. |
| 2005/0226156 A1 | 10/2005 | Keating et al. |
| 2005/0259575 A1 | 11/2005 | Krishnamurthi et al. |
| 2005/0270976 A1 | 12/2005 | Yang et al. |
| 2006/0013128 A1 | 1/2006 | Connor et al. |
| 2007/0269775 A1 | 11/2007 | Andreev et al. |
| 2008/0098005 A1 | 4/2008 | Goradia |
| 2009/0248182 A1 * | 10/2009 | Logan et al. ............... 700/94 |

OTHER PUBLICATIONS

Non-Final Office Action issued in U.S. Appl. No. 13/413,540, dated May 15, 2012.
Final Office Action issued in U.S. Appl. No. 13/413,540, dated Jan. 7, 2013.
Non-Final Office Action issued in U.S. Appl. No. 13/413,540, dated Nov. 1, 2013.
Final Office Action issued in U.S. Appl. No. 13/413,540, dated Jun. 5, 2014.

* cited by examiner

CHOOSE A LESSON > SONIC TEACHER

Choose A Lesson Below Or... | CLICK HERE TO CREATE REVIEW LESSON

| Lesson Title | *M/T | **% | Lesson Type | Lesson Theme | Level |
|---|---|---|---|---|---|
| Going to the Dentist | 0/50 | 0% | Short Story | Medical | 3 |
| Things Found on a Desk | 0/50 | 0% | Categorized Wordlist | At Work | 2 |
| Present Tense -IR Verbs | 14/50 | 28% | Drill | Grammar Exercises | 1 |
| Words for Dating | 0/11 | 0% | Categorized Wordlist | Relationships | 3 |

*M/T = Memorized Phrases/Total Phrases
**% = Percent Memorized

< BACK    NEXT >
HOME    ?

*Fig. 6*

LESSON INFORMATION > SONIC TEACHER

LESSON INFORMATION

Lesson Title: Words for Dating
Started: 1/10/02
Memorized/Total: 0/11
% Memorized: 0%
Lesson Type: Wordlist
Lesson Theme: Relationships
Level: 3
Last Quizzed: NA
Times Quizzed: NA
Description: Modern words for modern dating. No idiomatic expressions included.

LESSON CONTENT

| # | English | Spanish |
|---|---|---|
| 1 | the first date | la cita primera |
| 2 | to hold hands | cogerle la mano a |
| 3 | dinner | la cena |
| 4 | the movie | la pelicula |
| 5 | to dance | bailar |
| 6 | to kiss | besar |
| 7 | the date | la cita |
| 8 | pretty | bonito, bonita |
| 9 | the girlfriend | la novia |
| 10 | handsome | guapo, guapa |
| 11 | the boyfriend | el novio |

Click once on any phrase to hear the phrase
Click once on the number for more information about the phrase If you want to choose a different lesson, click "Back". Otherwise click "Next" to continue...

< BACK    NEXT >

HOME    ?

*Fig. 7*

VIEW MP3 INTERVAL SETTINGS > SONIC TEACHER

MP3 Interval Settings Title: SpeakLabs Default

Description: Best way to remember short list of words in little time

| | Round 1 | Round 2 | Round 3 | Round 4 | Round 5 | Round 6 |
|---|---|---|---|---|---|---|
| Sound 1 | English | Spanish | English | | | |
| Sound 2 | 2 SOS | 4 SOS | 2 SOS | | | |
| Sound 3 | Spanish | English | Spanish | | | |
| Sound 4 | | | 1 SOS | | | |
| Sound 5 | | | Spanish | | | |
| Sound 6 | | | | | | |
| Sound 7 | | | | | | |
| Sound 8 | | | | | | |
| Sound 9 | | | | | | |
| Sound 10 | | | | | | |
| Sound 11 | | | | | | |
| Sound 12 | | | | | | |
| Sound 13 | | | | | | |
| Sound 14 | | | | | | |
| Sound 15 | | | | | | |
| | LISTEN | LISTEN | LISTEN | LISTEN | LISTEN | LISTEN |
| | Shuffle ▷ | Shuffle ▷ | No Shuffle ▷ | No Shuffle ▷ | No Shuffle ▷ | No Shuffle ▷ |
| | ☐ Emphasis | ☐ Emphasis | ☐ Emphasis | ☐ Emphasis | ☐ Emphasis | ☐ Emphasis |

Seconds of Silence Between Different Phrases: 3
Seconds of Silence Between Different Rounds: 4
Estimated Length of MP3 Lesson File For "Words for Dating": 27 minutes/27MB

VIEW EMPHASIS SETTINGS

< BACK     HOME     ?

*Fig. 10*

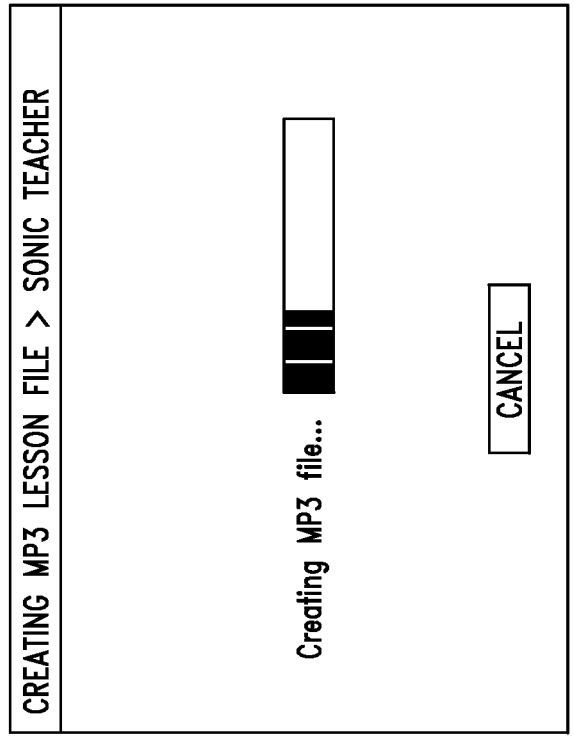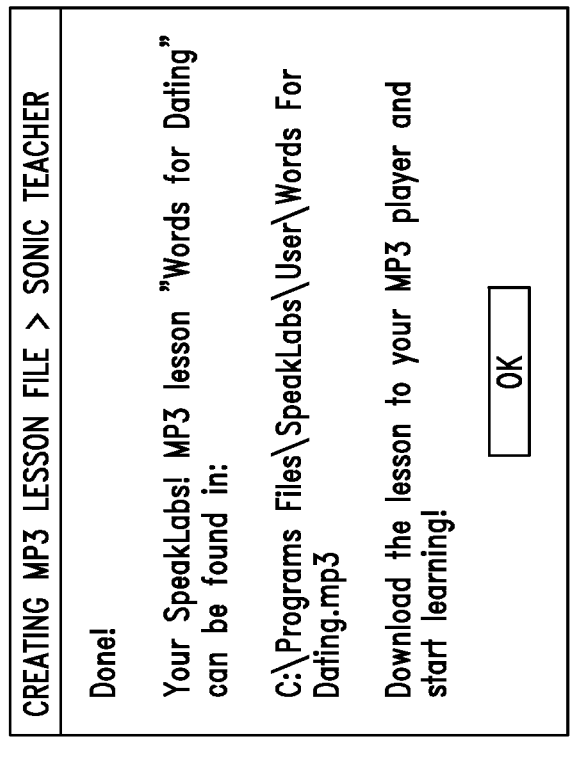
Fig. 11

CHOOSE A QUIZ > SONIC TEACHER

Below is the list of all of the lessons you've started.  Select the lesson you want to be quizzed on and click "Next"...

| Title | *M/T | ***% | Started On | Quizzed On | # Times Quizzed |
|---|---|---|---|---|---|
| Present Tense IR Verbs | 14/50 | 28% | 1/1/04 | 2/2/04 | 2 |
| Words for Dating | 0/11 | 0% | 1/1/04 | 2/2/04 | 0 |

*M/T = Memorized Phrases/Total Phrases
***% = Percent Memorized

< BACK    NEXT >

HOME    ?

*Fig. 13*

QUIZ FORMAT OPTIONS > SONIC TEACHER

LESSON INFORMATION

Lesson Title: Words for Dating
Started: 1/10/02
Memorized/Total: 0/11
% Memorized: 0%
Lesson Type: Wordlist
Lesson Theme: Relationships
Level: 3
Last Quizzed: NA
Times Quizzed: NA
Description: Modern words for modern dating. No idiomatic expressions included.

QUIZ FORMAT OPTIONS

⦿ English to Spanish
◯ Spanish to English
◯ Mixed

☐ Shuffle the order of the phrases
☑ Automatic sound
☑ Show phrase list
☐ 2 click answering ◯ No time limitation
◯ Countdown 11 minute(s) for entire quiz [60] second(s) per phrase]
⦿ Countdown [3] second(s) between question phrase and answer phrase
◯ Countdown [1x] the duration of the answer phrase after waiting [2] second(s)

LOAD DEFAULT        SAVE SETTINGS

< BACK        NEXT >
HOME          [?]

*Fig. 14*

QUIZ QUESTION PHRASE (1) > SONIC TEACHER the first date     1 Pass(es)     3 Second(s) left LISTEN    L     ?     LISTEN    Shift + L ☑ Automatic sound

| Question Phrase | Answer Phrase | Passes | Status |
|---|---|---|---|
| the first date | ? | 1 | 3 |
| to hold hands | ? | 0 | 3 |
| dinner | ? | 0 | 3 |
| the movie | ? | 0 | 3 |
| to dance | ? | 0 | 3 |
| to kiss | ? | 0 | 3 |
| the date | ? | 0 | 3 |
| pretty | ? | 0 | 3 |
| handsome | ? | 0 | 3 |

☑ Show phrase list

| WRONG! W | I DON'T KONW D | RIGHT! R | X 0 | Remaining Phrases 11 |
|---|---|---|---|---|
| < BACK B | I KNOW! SPACE | NEXT > N | 0 | Elapsed Time 01:05 |
| PAUSE P | MARK REMAING AS WRONG AND QUIT Q | CANCEL Esc | 0% | HOME   ? |

*Fig. 15*

| QUIZ ANSWER PHRASE (1) > SONIC TEACHER | | | | |
|---|---|---|---|---|
| the first date | | 1 Pass | la cita primera | 2 Seconds left |
| LISTEN | | | LISTEN | |
| L | | | Shift + L | |

☑ Automatic sound

| Question Phrase | Answer Phrase | Passes | Status |
|---|---|---|---|
| the first date | la cita primera | 1 | 2 |
| to hold hands | ? | 0 | 3 |
| dinner | ? | 0 | 3 |
| the movie | ? | 0 | 3 |
| to dance | ? | 0 | 3 |
| to kiss | ? | 0 | 3 |
| the date | ? | 0 | 3 |
| pretty | ? | 0 | 3 |
| the girlfriend | ? | 0 | 3 |
| handsome | ? | 0 | 3 |

| WRONG! | I DON'T KONW | RIGHT! | | ☑ Show phrase list |
| W | D | R | | |
| < BACK | I KNOW! | NEXT > | X ✓ | Remaining Phrases |
| B | SPACE | N | 0 0 | 11 |
| PAUSE | MARK REMAING AS WRONG AND QUIT | CANCEL | 0% ✓ | Elapsed Time |
| P | Q | Esc | | 01:05 |

HOME   ?

*Fig. 16*

| QUIZ QUESTION PHRASE (2) > SONIC TEACHER | | | | |
|---|---|---|---|---|
| to hold hands | | 1 Pass | ? | 2 Seconds left |
| LISTEN | | | LISTEN | |
| L | | | Shift + L | |

☑ Automatic sound

| Question Phrase | Answer Phrase | Passes | Status |
|---|---|---|---|
| the first date | la cita primera | 1 | ✓ |
| to hold hands | ? | 1 | 2 |
| dinner | ? | 0 | 3 |
| the movie | ? | 0 | 3 |
| to dance | ? | 0 | 3 |
| to kiss | ? | 0 | 3 |
| the date | ? | 0 | 3 |
| pretty | ? | 0 | 3 |
| the girlfriend | ? | 0 | 3 |
| handsome | ? | 0 | 3 |

| WRONG! | I DON'T KONW | RIGHT! |
|---|---|---|
| W | D | R |

| < BACK | I KNOW! | NEXT > |
|---|---|---|
| B | SPACE | N |

| PAUSE | MARK REMAING AS WRONG AND QUIT | CANCEL |
|---|---|---|
| P | Q | Esc |

☑ Show phrase list

✗ 0 ✓ 1

9%

Remaining Phrases
10

Elapsed Time
01:05

HOME  ?

*Fig. 17*

QUIZ RESULTS > SONIC TEACHER

Congratulations! You've just completed the quiz for "Words For Dating"

QUIZ RESULTS

The checkmarked box signifies a successfully memorized word

| # | ✓ | Rank | Question Phrase | Answer Phrase |
|---|---|---|---|---|
| 1 | ☑ |  | the first date | la cita primera |
| 2 | ☐ | 1 | to hold hands | cogerle la mano a |
| 3 | ☐ |  | dinner | la cena |
| 4 | ☐ |  | the movie | la pelicula |
| 5 | ☐ |  | to dance | bailar |
| 6 | ☐ |  | to kiss | besar |
| 7 | ☐ | 2 | the date | la cita |
| 8 | ☐ |  | pretty | bonito, bonita |
| 9 | ☐ | 3 | the girlfriend | la novia |
| 10 | ☐ |  | handsome | guapo, guapa |
| 11 | ☐ |  | the boyfriend | el novio |

Quiz Statistics

Quiz length: 11 questions
Quiz time: 8 mins., 22 secs.

1 word out of 11 successfully memorized during this quiz 1 word out of 11 successfully memorized in the entire lesson so far 9% of "Words For Dating" lesson memorized so far To further help us create better lessons for you, please rank the incorrect phrases in the order of difficulty starting with the most difficult phrase. You don't have to rank all of them but as much as you would like to. Click OK when you're done.

Your lesson has been updated to reflect the words you've memorized.
Good work!

HOME    OK
         ?

*Fig. 18*

CREATE NEW MP3 INTERVAL SETTINGS > SONIC TEACHER

MP3 Interval Settings Title [ ]   Description [ ]

| | Round 1 | Round 2 | Round 3 | Round 4 | Round 5 | Round 6 |
|---|---|---|---|---|---|---|
| Sound 1 | | | | | | |
| Sound 2 | | | | | | |
| Sound 3 | | | | | | |
| Sound 4 | | | | | | |
| Sound 5 | | | | | | |
| Sound 6 | | | | | | |
| Sound 7 | | | | | | |
| Sound 8 | | | | | | |
| Sound 9 | | | | | | |
| Sound 10 | | | | | | |
| Sound 11 | | | | | | |
| Sound 12 | | | | | | |
| Sound 13 | | | | | | |
| Sound 14 | | | | | | |
| Sound 15 | | | | | | |
| | LISTEN | LISTEN | LISTEN | LISTEN | LISTEN | LISTEN |
| | No Shuffle ▷ | No Shuffle ▷ | No Shuffle ▷ | No Shuffle ▷ | No Shuffle ▷ | No Shuffle ▷ |
| | ☐ Emphasis | ☐ Emphasis | ☐ Emphasis | ☐ Emphasis | ☐ Emphasis | ☐ Emphasis |

Seconds of Silence Between Different Phrases [3]
Seconds of Silence Between Different Rounds [4]

This space is reserved for error messages when the user edits the cells

[VIEW EMPHASIS SETTINGS]
[< BACK]   [SAVE]
[HOME]    [?]

*Fig. 22*

UPLOAD YOUR OWN LESSON > SONIC TEACHER

LESSON INFORMATION

Lesson Title: My lesson
Lesson Type:
Lesson Theme:
Description:

LESSON CONTENT

| # | Native | | Translated | |
|---|---|---|---|---|
| 1 | chicken | <- Rec | pollo | <- Rec |
| 2 | cheese | <- Rec | queso | <- Rec |
| 3 | drink | <- Rec | bebida | <- Rec |
| 4 | water | <- Rec | agua | <- Rec |
| 5 | bread | <- Rec | pan | <- Rec |
| 6 | tomato | <- Rec | tomate | <- Rec |

Type in the lesson information to the right of the colon

Type the your native language phrase on the left and the translation on the right Click once on Rec to record your voice saying the phrase then click again to stop the recording To hear you recorded, hover the mouse ove the phrase Click "Back" to start over. Otherwise click "Next" to upload your content...

< BACK    NEXT >
HOME    ?

*Fig. 25*

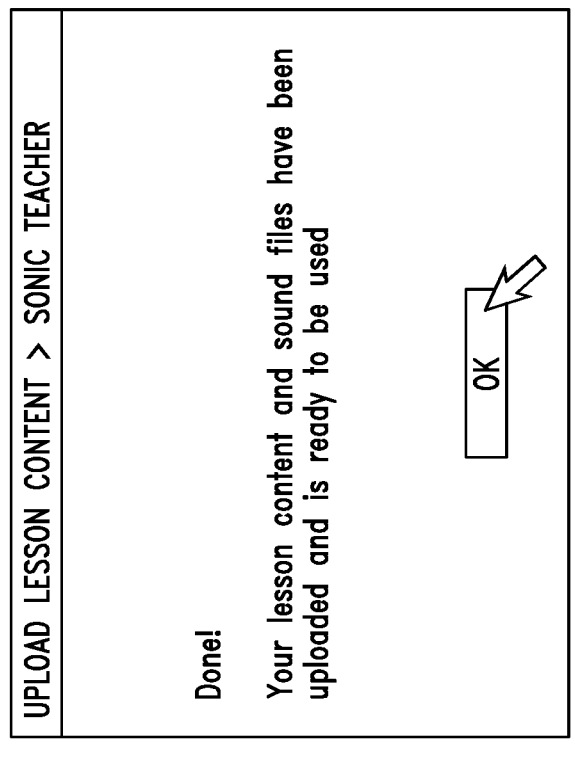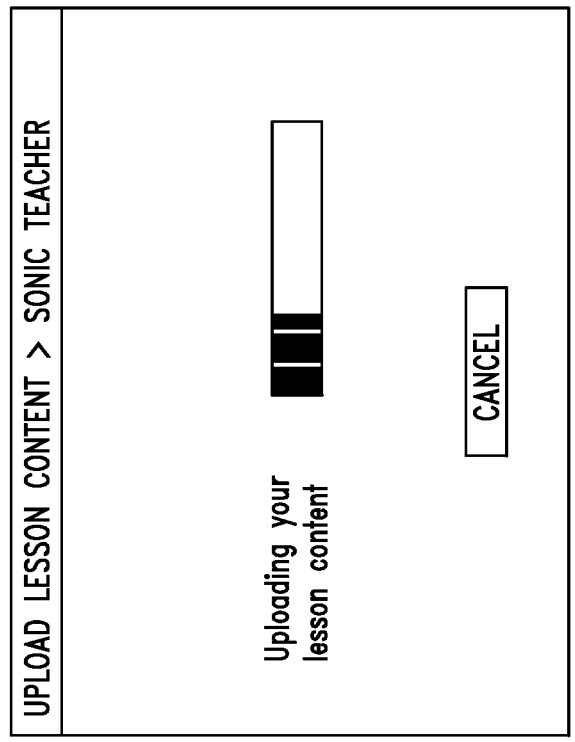
Fig. 26

CREATE A REVIEW LESSON > SONIC TEACHER

Review Lesson Rules

You can automatically create a Review Lesson to effectively review the more challenging phrases you encountered in prior completed lessons according to the following rules:

☑ The review lesson should include phrases that I successfully memorized after [3] uiz(zes).
(The higher the number, the fewer the number of phrases will appear in the review lesson)

☑ The review lesson should include the earliest [20] % of the phrases I memorized.
(The higher the percentage, the higher the number of phrases will appear in the review lesson)

☑ Always exclude from the review lesson phrases I successfully memorized after [1] uiz(zes).
(The higher the number, the fewer the nummer of phrases will appear in the review lesson)

[LOAD DEFAULT]  [SAVE SETTINGS]

Check the review lessons that you want to create and the click "Next"...

Review Lessons

| | Lessons Name | # of Phrases | Completed |
|---|---|---|---|
| ☑ | Completed Lesson 1 | 32 | 3/3/02 |
| ☐ | Completed Lesson 2 | 13 | 4/7/02 |
| ☐ | Completed Lesson 3 | 16 | 5/3/02 |
| ☐ | Completed Lesson 4 | 21 | 6/3/02 |

[< BACK]  [NEXT >]
[HOME]  [?]

ADAPTABLE AUDIO INSTRUCTION SYSTEM AND METHOD

CROSS REFERENCE TO RELATED APPLICATION

This application claims priority benefit of provisional application Ser. No. 60/760,226 filed Jan. 18, 2006.

FIELD OF THE INVENTION

This invention is related in general to audio systems.

BACKGROUND OF THE INVENTION

Audio based systems can be used to present fixed audio sequences for instructional purposes. Such fixed audio sequences can be related to a foreign language or other material to be learned. The fixed audio sequences can be stored on analog tapes or digital files and played on tape players or digital audio players, respectively. Digital audio players can include computers and/or portable devices. The digital audio files can include, but are not limited to mp3, wav, aiff, au, vorbis, wma, aac, apple, ape and other lossy and lossless compression formats.

Various formats can be used to present the fixed audio sequences. One such format includes a series of audio content pairs that are presented in a time sequenced order when the audio sequence is played. Each of the audio content pairs include a first audio content played first in the time sequenced order and a second audio content played after the first audio content is played.

For instance, in the case of foreign language instruction, for each audio content pair, the first audio content may be a particular word or phrase in a first language and the second audio content may be the equivalent word or phrase in a second language. Other content may include for each audio content pair a question or other sort of cue for either the first audio content or the second audio content and an answer or other sort of response for the other of the first audio content and the second audio content.

Each audio content pair can include a pause positioned in the time sequenced order between the first audio content and the second audio content of the pair. This type of pause is referred to herein as an intra-pause. Intra-pauses can be used by a hearer to think of or verbalize the second audio content of a audio content pair after the first audio content of the pair has been played but before the second audio content is played.

Pauses can be also placed in the time sequenced order before and after each of the pairs. These pauses are referred to herein as inter-pauses. Inter-pauses are used to separate audio content pairs from one another, but are otherwise typically indistinguishable as to type from intra-pauses other than the differing placement in the time sequence order of the intra-pauses compared with the inter-pauses.

As the fixed audio sequences are initially heard by an individual, all the material may be unfamiliar. After the initial and subsequent presentations of the fixed audio sequences, the material as a whole becomes more familiar to the individual and in particular, some portions of the material are typically learned by the individual more quickly than other portions.

Unfortunately, the fixed audio sequences of the audio tapes and digital audio files remain in the same state to be re-played identically to when they were first heard by the individual rather than being modified to the changing state of learning of the individual. For instance, even though the individual will learn some portions of the material faster than others, the initial fixed order of the audio sequence with the original content selection is continually re-played. Audio content that is already learned by the individual must be heard again in order to hear accompanying audio content that is not yet learned thereby reducing efficiency and effectiveness of the audio based instruction.

BRIEF DESCRIPTION OF THE SEVERAL VIEWS OF THE DRAWING(S)

FIG. 6 is an illustration of a second depicted screen shot of an implementation of a portion of the adaptable audio instruction system.

FIG. 7 is an illustration of a third depicted screen shot of an implementation of a portion of the adaptable audio instruction system.

FIG. 10 is an illustration of a sixth depicted screen shot of an implementation of a portion of the adaptable audio instruction system.

FIG. 11 is an illustration of a seventh depicted screen shot of an implementation of a portion of the adaptable audio instruction system.

FIG. 13 is an illustration of a ninth depicted screen shot of an implementation of a portion of the adaptable audio instruction system.

FIG. 14 is an illustration of a tenth depicted screen shot of an implementation of a portion of the adaptable audio instruction system.

FIG. 15 is an illustration of an eleventh depicted screen shot of an implementation of a portion of the adaptable audio instruction system.

FIG. 16 is an illustration of a twelfth depicted screen shot of an implementation of a portion of the adaptable audio instruction system.

FIG. 17 is an illustration of a thirteenth depicted screen shot of an implementation of a portion of the adaptable audio instruction system.

FIG. 18 is an illustration of a fourteenth depicted screen shot of an implementation of a portion of the adaptable audio instruction system.

FIG. 22 is an illustration of an eighteenth depicted screen shot of an implementation of a portion of the adaptable audio instruction system.

FIG. 25 is an illustration of a twenty first depicted screen shot of an implementation of a portion of the adaptable audio instruction system.

FIG. 26 is an illustration of a twenty second depicted screen shot of an implementation of a portion of the adaptable audio instruction system.

FIG. 28 is an illustration of a twenty fourth depicted screen shot of an implementation of a portion of the adaptable audio instruction system.

DETAILED DESCRIPTION OF THE INVENTION

An adaptable audio instruction system and method are described herein to allow for tailoring and modification to audio sequences used for audio instruction of users. The tailoring and modification abilities of the system regard content and presentation details of the audio sequences to comply with user preferences and user progress in learning content contained in the audio sequences.

Figure 1:
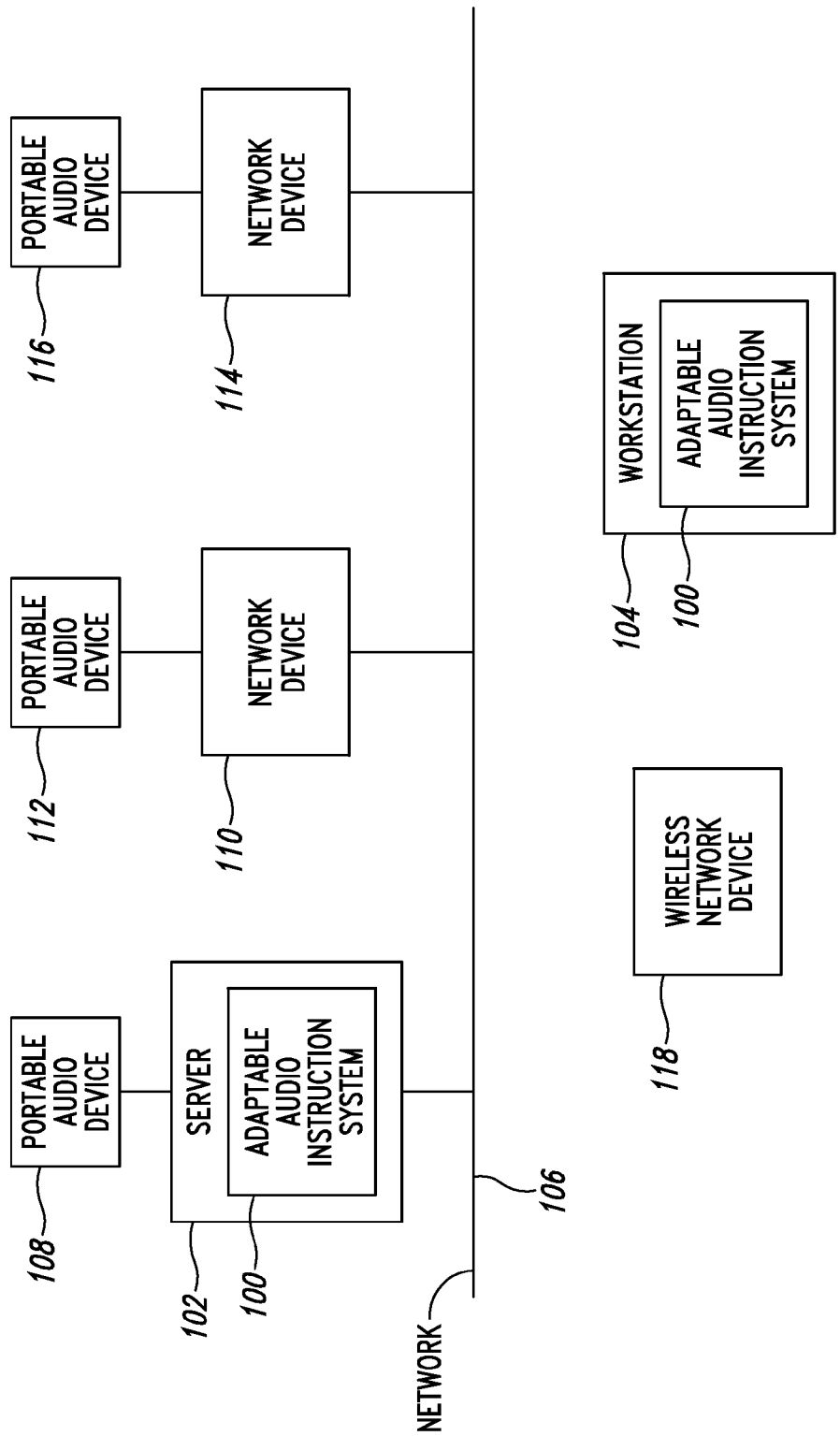
FIG. 1 is a schematic block diagram of an exemplary implementation of an adaptable audio instruction system as in use with various audio players.

Exemplary implementations of an adaptable audio instruction system 100 are shown in FIG. 1 to include an implementation located on a networked server 102 and another implementation located on a standalone workstation 104. The server 102 is shown coupled to a network 106 to communicate with other devices that are also coupled to the network. The server uses the instruction system 100 to assemble and/or re-assemble audio sequences to be stored and subsequently played either directly on the server or on another device either coupled directly to the server or coupled to the network 106.

For instance, a portable audio device 108 is shown directly coupled to the server 102 to receive one or more audio sequences from the server 102. A network device 110, such as a computer or other networkable device, is shown coupled to the network 106 to receive audio sequences from the server 102. The network device 110 can also send instructions to the server 102 regarding how the audio sequences are to be assembled. A portable audio device 112 is shown coupled to the network device 110 to receive audio sequences that were originally received by the network device from the server 102, to be stored and subsequently played on the portable device.

Another network device 114 is shown coupled to the network 106 with a portable audio device 116 that is uncoupled from the network device and has audio sequences stored in the portable audio device to be played by a user. The audio sequences were received from the network device 114 by the portable audio device 116 at a prior time when the portable audio device was coupled to the network device.

A wireless network device 118 is also depicted in FIG. 1 that can receive audio sequences assembled by the instruction system 100 from the server 102 through wireless communication such as a cellular system or a wireless computer network. The wireless network device 118 can store the received audio sequences for subsequent playback for a user of the wireless network device.

The instruction system 100 that runs on the workstation 104 can assemble audio sequences to be stored on the workstation. The workstation 104 can then later play the audio sequences for a user.

Figure 2:
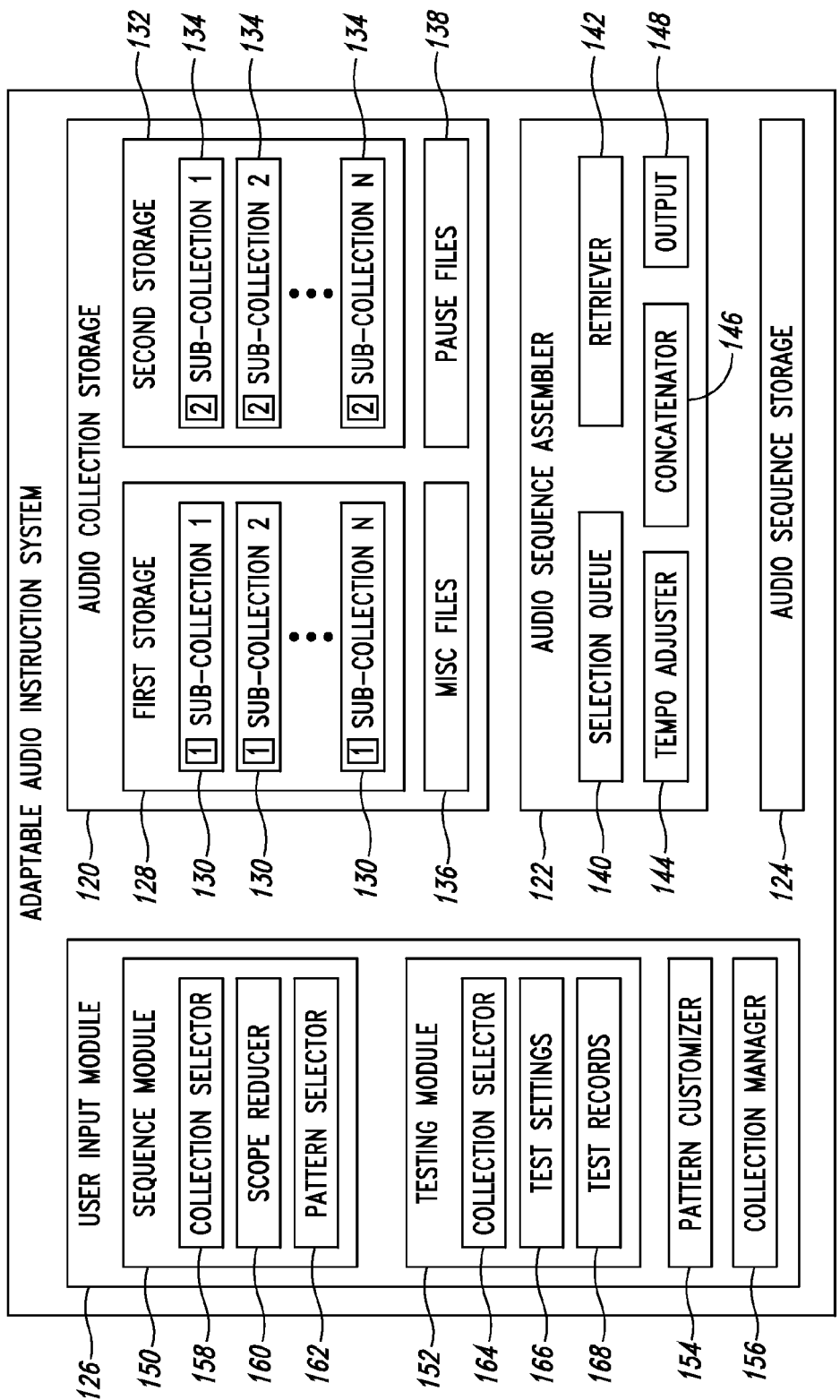
FIG. 2 is a schematic block diagram of the adaptable audio instruction system of FIG. 1 showing component detail.

An exemplary implementation of the instruction system 100 is shown in FIG. 2 to include an audio collection storage 120, an audio sequence assembler 122, an audio sequence storage 124, and a user input module 126. The audio collection storage 120 is used to store audio files arranged according to audio collections. Each audio collection is comprised of a first audio sub-collection and a second audio sub-collection. An audio collection is a group of audio file pairs each containing an audio content pair with the group associated with one or more common attributes. The first audio files of each of the audio file pairs can be stored together in one audio sub-collection and the second audio files of each of the audio file pairs can be stored together in another audio sub-collection.

The depicted exemplary implementation of the audio collection storage 120 has a first audio sub-collection storage 128 containing a plurality of first audio sub-collections 130 and a second audio sub-collection storage 132 containing a plurality of second audio sub-collections 134. For each first audio sub-collection 130 stored in the first audio sub-collection storage 128, a corresponding second audio sub-collection 134 is stored in the second audio sub-collection storage 132.

For instance, an audio collection could be directed to assist a user to learn individual words of a foreign language regarding food. As an example, the audio collection could contain audio file pairs having one attribute related to food and another attribute related to teaching an English speaking user to learn Spanish. In this example the first file of each of the audio file pairs of the audio collection could be arranged in a Spanish food words sub-collection with each audio file of the Spanish food words sub-collection being directed to a different Spanish word regarding food.

Furthermore, the second file of each of the audio file pairs of the audio collection could be arranged in an English food words sub-collection with each audio file of the English food words sub-collection being directed to an English word corresponding to the Spanish word contained in the first file of the audio file pair and stored in the Spanish food words sub-collection. In the depicted implementation of the instruction system 100, the English food words sub-collection and the Spanish food words sub-collection would each be stored in a different one of the first audio sub-collection storage 128 as one of the first audio sub-collections 130 and the second audio sub-collection storage 132 as one of the second audio sub-collections 134.

Other foreign language audio collections could be directed to phrases or sentences instead of individual words regarding food. Other foreign language audio collections could be directed to learning a foreign language regarding a topic other than food such as a topic of travel with rudimentary expressions used when taking an airplane, train, or taxi. Other foreign language audio collections could be directed to other parts of speech or aspects of learning a foreign language.

Other audio collections may be directed to other areas of study besides learning a foreign language. Depending upon the area of study, the type of content that each audio file contains may also differ. For instance, for areas of study that are not related to learning a foreign language the type of content may contain factual information regarding the area of study, for instance, history, geography, science, mathematics, art, music, etc. The presentation format of the content contained in the audio files may also differ and may include sub-collections having questions and corresponding sub-collections having answers or may include sub-collections having other sorts of cues and sub-collections having other sorts of associated responses.

The audio collection storage further contains a miscellaneous audio files storage 136 and a pause files storage 138. The miscellaneous audio files storage 136 can contain emphasis audio files that are used for particular audio file pairs, for audio sequence section endings, or for other purposes. An emphasis audio file contains a word, phrase, or other sound that is used to distinguish such as an audio file pair or audio sequence sections from other audio file pairs or other audio sequence sections. For instance, an audio file pair is distinguished typically by playing the emphasis file immediately preceding play of the audio file pair to be distinguished in an audio sequence.

Other audio files that can be stored in the miscellaneous audio files storage 136 can include demarcation audio files that can be inserted during assembly of an audio sequence either at the beginning, ending, or some other place in the audio sequence. Demarcation audio files can be used to indicate to a user beginnings, endings, or other organizational aspects of particular topical sections of an audio sequence or of the entire audio sequence. An audio file pair is distinguished typically because the user needs to be more attentive to the play of the audio file pair. A pause file contains a pause of silence, neutral tone or other sound for a specified amount of time to be used as either intra-pauses or inter-pauses. Pause files can have different durations and can be assembled together into an audio sequence to create pauses of other durations.

The audio sequence assembler 122 contains a selection queue 140, a retriever 142, a tempo adjuster 144, a concatenator 146, and an output 148. The selection queue 140 can hold information as to what audio collection is being selected to be used as a source of audio file pairs and what audio file pairs of the selected audio collection will be assembled together into an audio file to form a desired audio sequence.

The selection queue 140 can also contain information regarding the play pattern for each selected audio file pair. The play pattern can indicate among other things how many times the first audio file and the second audio file of each audio file pair will be played. The play pattern can also indicate play order for the various times that the first audio file and the second audio file of each audio file pair will be played.

For instance, the play pattern may indicated that the first audio file of each audio file pair is to be played once and the second audio file of each audio file pair is to be played twice having a play pattern for each audio file pair of playing the first audio first and then playing the second audio file two successive times. The play pattern can also indicate what and how one or more emphasis files, if desired, are to be used in the audio sequence. The play pattern can also indicate what and how one or more pause files are to be used in the audio sequence.

The retriever 142 accesses the audio collection storage 120 to obtain audio file pairs from a selected audio collection, any desired emphasis files, and any desired pause files to be used for assembly of an audio sequence according to information contained in the selection queue 140. The tempo adjuster 144 uses information contained in the selection queue 140 to either modify the play times of audio files obtained by the retriever 142 or to refine information contained in the selection queue 140 so that the retriever will obtain audio files based upon a selected tempo.

Tempo is selected either directly by a user through the pattern selector 162 or from test results obtained by the pattern selector from the test records storage 168. As a user becomes more familiar with an audio collection, the tempo at which the user is able to listen to remaining audio file pairs can typically be increased. A user may also have an advanced familiarity with a certain area of study so may desire to increase the initial tempo of an originally assembled audio sequence based upon an audio collection related to the familiar area of study. There can be more than one approach available to adjust tempo.

For instance, a particular audio content pair could have more than one associated audio file pair. Each audio file pair would contain the same information of the audio content pair, but each audio file pair would be recorded at a different tempo so that a particular one of the audio file pairs can be selected to match a desired playback tempo. This approach can also be used for emphasis files. For a particular emphasis statement, more than one emphasis file can be recorded with each having a different playback tempo. One of the emphasis files associated with the particular emphasis statement can then be selected to match a desired playback tempo.

Regarding the pause files, the tempo adjuster 144 can select from pause files with various durations to accommodate different tempos that may be generally used for a given audio sequence. The tempo adjuster 144 can also be configured to select pause files with different duration based on a proportional spacing approach associated with the duration of the first audio content and/or the duration of the second audio content of individual audio content pairs as recorded at particular tempos in audio file pairs.

In some implementations, playback tempo associated with an audio content pair need not depend solely on the original recording tempo of an associated audio file pair. For a particular audio content pair, only one audio file pair is recorded at generally a medium tempo. The one audio file pair is then used for any desired playback of the particular audio content pair. The tempo of playback can be adjusted as desired through either the playback equipment, such as an mp3 player, or by modifying a temporary copy of the audio file pair to be played back at a tempo other than the originally recorded tempo. Such implementations may include use of tempo instructions sent to an audio player along with the audio file pair to be played. Other such implementations may include a version of the tempo adjuster 144 configured to modify the audio file pairs after they are obtained by the retriever 142 so that their playback tempos are adjusted as desired.

The concatenator 146 is used to merge the selected audio files to be played as one audio file for the audio sequence. Once the audio file for the audio sequence is generated by the concatenator the audio sequence file is sent to the output 148 and then either to the audio sequence storage 124 or to another device requesting the audio sequence.

The user input module 126 includes a sequence module 150, a testing module 152, a pattern customizer 154, and a collection manager 156. The sequence module 150 contains a collection selector 158, a scope reducer 160, and a pattern selector 162. The collection selector 158 allows a user to indicate a desired audio collection to be used as a source for audio file pairs to be assembled into an audio sequence, such indication can be passed on to the selection queue 140 for processing by the audio sequence assembler 122.

The scope reducer 160 allows the user to selectively exclude undesired ones of the audio file pairs from a selected audio collection so that only the audio file pairs not excluded by the user will be assembled as part of an audio sequence by the audio sequence assembler 122. Alternatively, the scope reducer 160 allows the user to select desired audio file pairs of the selected audio file collection. The pattern selector 162 allows a user to select a play pattern, for each of the audio file pairs as described above and further described below, to be used in assembling an audio sequence.

The testing module 152 is used to test a user on the user's current level of learning of a whole audio collection or subset of the audio collection. The testing module 152 has a collection selector 164, a test settings selector 166, and a test records storage 168. The user selects which audio collection the user is to be tested on with the collection selector 164.

The user can configure the test by using the test settings selector 166 to choose various options in how the test is formatted and administered as further depicted below. The test records storage 168 contains results of previous tests run by the user and can be accessed by the selection queue 140 of the audio sequence assembler 122 to help in selecting which audio file pairs to include of an audio collection selected as a source for the audio sequence assembler to assemble into an audio sequence.

Use of test results to reduce the number of audio file pairs assembled into an audio sequence is one way that the instruction system 100 can be viewed as being adaptable. In this manner, audio file pairs that are already learned by the user as evidenced by test results stored in the test records storage 168 need not be included in an audio sequence intended to be used by the user to learn remaining unlearned audio file pairs of a particular audio collection.

The pattern customizer 154 in the user input module 126 can be used by a user to define an additional play pattern that can be available for selection through the pattern selector 162. The selected play pattern can then be stored in the selection queue 140 to direct the audio sequence assembler 122 in how each of the audio file pairs are to be assembled to produce an audio sequence.

The collection manager 156 in the user input module 120 allows a user to input audio file pairs to be included in one or more audio collections as stored in the audio collection storage 120. The collection manager 156 can be used to either build new audio collections or amend audio file pairs to existing audio collections. The collection manager 156 can also be used to remove existing audio file pairs from an existing audio collection if desired by a user.

Figure 3:
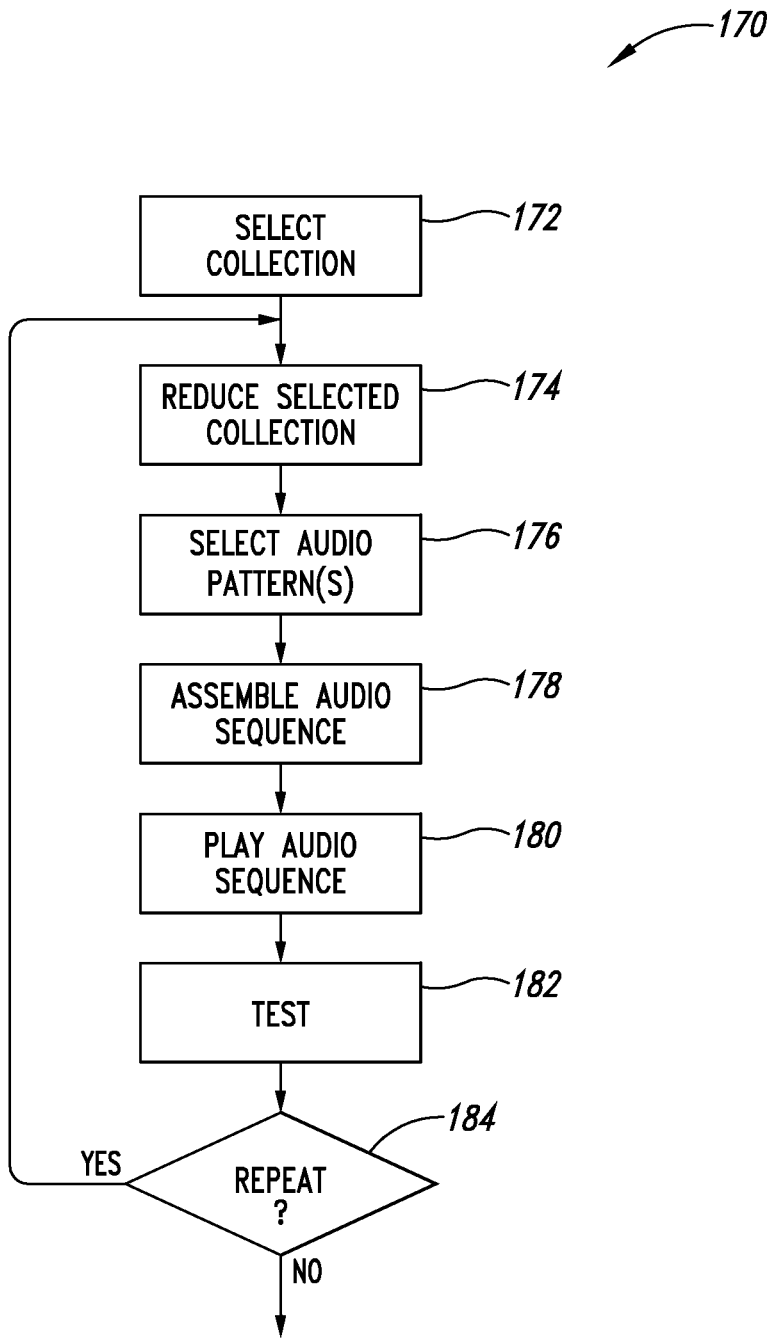
FIG. 3 is a flow chart of a method of the adaptable audio instruction system of FIG. 1.

A method 170 for the instruction system 100 is shown in FIG. 3 to include selecting an audio collection (step 170) to be used as a source of audio file pairs to be assembled into an audio sequence to be used by a user to learn audio file pairs of the audio collection. Prior testing of the user regarding the audio collection and user preferences can be used to possibly exclude some of the audio file pairs from being assembled into the audio sequence (step 174). The user, the instruction system 100, or another selects a play pattern (step 176) to be used to guide assembly of the audio file pairs into an audio sequence.

The remaining audio file pairs not selected for exclusion (step 174) are then assembled into an audio sequence (step 178). The user listens to the audio sequence (step 180) being played by a playback device to further learn the audio content pairs contained in the audio file pairs found in the audio sequence. After listening to the audio sequence, the user takes a test (step 182). Depending upon the test results and/or user preference the method 170 returns (YES branch of decision step 184) to reducing the number of audio file pairs from the selected audio collection for a subsequent re-assembled audio sequence (step 174) or the method otherwise continues (NO branch of decision step 184).

Figure 4:
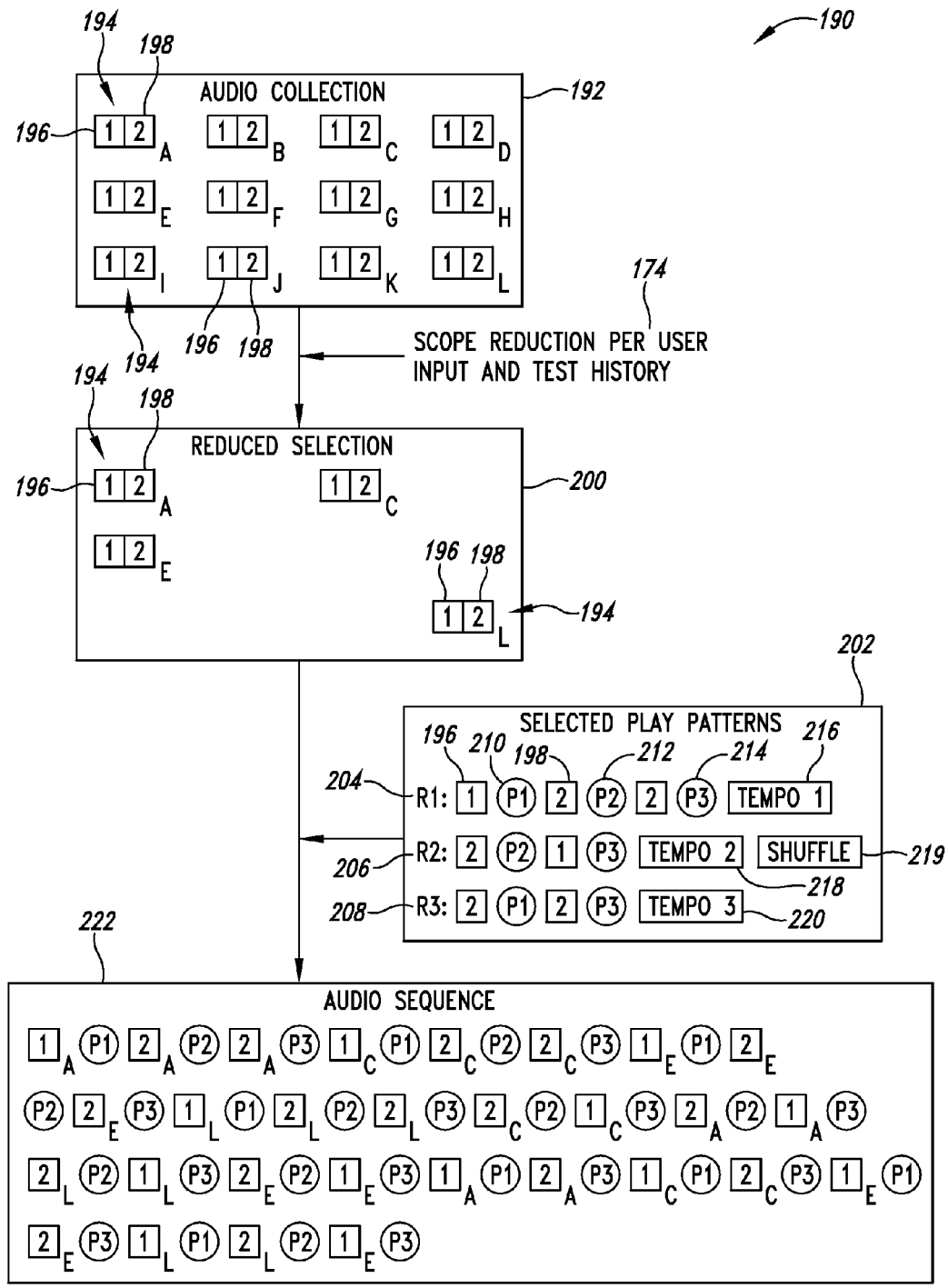
FIG. 4 is a process schematic showing detail of audio sequence production by the adaptable audio instruction system of FIG. 1.

An exemplary process 190 showing further detail regarding an illustrative assembly of an exemplary audio sequence by the depicted implementation of the instruction system 100 is shown in FIG. 4. The exemplary process 190 begins with an illustrative audio collection 192 containing twelve audio file pairs 194. Each of the audio file pairs 194 contains a first audio content 196 and a second audio content 198.

In some implementations, prior to assembly of a sequence for each of the audio file pairs 194, the first audio content 196 and the second audio content 198 are stored in separate audio files to increase flexibility as to how subsequent play patterns can be produced. Whereas in other implementations, prior to assembly for each of the audio file pairs 194, the first audio content 196 and the second audio content 198 are stored in the same audio file, which may reduce flexibility of assembly of play patterns buy may have other advantages.

The process 190 continues by excluding a number of the audio file pairs 194 from further processing through scope reduction according to user preference and/or results from prior testing (step 174 of method 170). Exclusion of some of the audio file pairs 194 from the audio collection 192 results in a reduced audio collection 200 having an illustrative number of four audio file pairs. Exemplary play patterns 202 are then selected (step 176 of method 170) to guide audio sequence assembly.

The selected play patterns 202 include a first round play pattern 204 for a first playing through of all of the audio file pairs each containing different audio content pairs in the audio file sequence, a second round play pattern 206 for a second playing through of all of the audio file pairs in the audio file sequence, and a third round play pattern 208 for a third playing through of all of the audio file pairs in the audio file sequence.

For the first round play pattern 204, for each of the four audio file pairs 194 to be played, the first audio content 196 is played, followed by a first pause 210 having a first amount of delay, followed by the second audio content 198, followed by a second pause 212 having a second amount of delay, followed by the second audio content 198 again, followed by a third pause 214 having a third amount of delay. The first round play pattern 204 has an associated first tempo 216 that is used by the tempo adjuster 144 for each of the audio file pairs 194 to adjust duration of play for the first audio content 196 and the second audio content 198.

For the second round play pattern 206, for each of the four audio file pairs 194 to be played, the second audio content 198 is played, followed by the second pause 212, followed by the first audio content 196, followed by the third pause 214. The second round of play 206 has an associated second tempo 218 that is used by the tempo adjuster 144 for each of the audio file pairs 194 to adjust duration of play for the first audio content 196 and the second audio content 198. The second round play pattern 206 includes a shuffle indicator 219 that instructs the audio sequence assembler 122 to reorder the audio file pairs such as in a random or other reordered manner relative to the first round play pattern 204. Shuffling the audio file pairs for one or more rounds reduces reliance by a user on a particular ordering of the audio file pairs within an audio sequence.

For the third round play pattern 208, for each of the four audio file pairs 194 to be played, the first audio content 196 is played, followed by the first pause 210, followed by the second audio content 198, followed by the second pause 212, followed by the third pause 214. The third round of play 208 has an associated third tempo 220 that is used by the tempo adjuster 144 for each of the audio file pairs 194 to adjust duration of play for the first audio content 196 and the second audio content 198.

If one or more of the audio file pairs 194 were to be distinguish for special attention by the user, an emphasis file could be inserted at the beginning of each of the first round 204, the second round 206, and the third round 208 for the audio file pairs to be distinguished. When the illustrative play pattern 202 is applied by the audio sequence assembler 122 to the reduced audio collection 200 an audio sequence 222 is produced as illustrated.

Using Silence Files.

Silence files can be used to make absolute silences or proportional silences. Absolute silences are silent gaps whose lengths are not determined by the duration of a relevant phrase. For example, a audio sequence used for a lesson could have just one second of silence between the first audio content and the second audio content (such as one second between English and Spanish phrase files). If all of the phrases are about one second long, there could be enough time to repeat the phrase within the silence provided in the audio sequence lesson.

However, if the phrases of the first audio content and the second audio content are of different durations (such as because there are more words in some phrases than in others), then the one second of silence placed between the first audio content and the second audio content for each audio file pair would not be enough time to think and repeat the phrases longer than a one second. For example, "the car" and "el coche" take about the same amount of time to say (about ½ a second). So if the first audio content of an audio file pair was "the car" followed by a one second pause, it would be ample time for the user to say "el coche" during that one second of silence before hearing "el coche" from the second audio content of the audio file pair right after the silence.

But if the English phrase for the first audio content was longer, like "to go on a trip to the United States", the Spanish phrase for the second audio content would be, "Ir un viaje a Estados Unidos". This second audio content would take far more than one second to recall and say. Thus one second would be too short a silence to allow the user to recall and say. The user may need two seconds or three second if the user stumbles on any of the words in the phrase. So using absolute time periods for pauses, such as silence pauses, between phrases for the first audio content and the second audio content when the phrases in a lesson audio sequence are of different durations would yield a lesson whose silences were a proper duration for some phrases but too short for other phrases.

In contrast to the pauses of absolute duration, proportional pauses such as used for silence pauses can at times better accommodate audio sequences with varying duration for audio file pairs and especially for varying duration of second audio content such as when the audio file pairs are phrases as described above. The proportional pauses have durations that are proportional to the duration of the second audio content phrase that immediately follows the proportional pause.

Thus, when proportional pauses are used, if a audio sequence would have a first audio content phrase of "to go on a trip to the United States" and a second audio content phrase of "Ir un viaje a Estados Unidos", the proportional pause to be placed after the first audio content can be created of sufficient duration to give a user enough time to fully say the second audio content phrase in its entirety. As an example, an English phrase for the first audio content of an audio file pair may have a duration of 1.2 seconds and an Spanish phrase for the second audio content of the same audio file pair has a duration of 1.4 seconds. Also, as part of the present example, the user needs to guess the second audio content Spanish phrase. With proportional pauses, the tempo adjuster 144 can create a proportional silence between the first audio content English phrase and the second audio content Spanish phrase that equals any of the following durations found in Table 1.

TABLE 1

| PS | Ir un viaje a Estados Unidos (1.4 seconds) |
|---|---|
| .25x | 0.35 |
| .5x | 0.7 |
| .75x | 1.05 |
| 1x | 1.4 |
| 1.25x | 1.75 |
| 1.5x | 2.1 |
| 1.75x | 2.45 |
| 2x | 2.8 |
| 2.25x | 3.15 |
| 2.5x | 3.5 |
| 2.75x | 3.85 |
| 3x | 4.2 |
| 3.25x | 4.55 |
| 3.5x | 4.9 |
| 3.75x | 5.25 |
| 4x | 5.6 |
| 4.25x | 5.95 |
| 4.5x | 6.3 |
| 4.75x | 6.65 |
| 5x | 7 |

Continuing the example, since the user is learning Spanish, the user will want to be allowed twice the duration of the second audio content Spanish phrase in order to think through what to say and then say the Spanish phrase. Thus, for this example, the user will want a selection according to Table 1 of 2x, or namely, 2.8 seconds for a silence pause file. As implemented, the user would hear the first audio content English phrase, then 2.8 seconds of silence, and then the equivalent Spanish phrase second audio content.

One approach that the tempo adjuster could take to create the portion of the audio sequence for the 2.8 seconds of silence between the first audio content and second audio content would be to add two pause files together such as a first pause file of two seconds duration and a second pause file of 0.8 seconds duration.

In practice, for example, if the user is fluent in English and wants to learn Spanish, it is more likely that the user will use proportional silences that are greater than 1× if Spanish was used for the second audio content of the audio file pairs. However if the user used the audio instruction system to create an audio sequence for a lesson that used Spanish phrases as the first audio content of the audio file pair and English phrases for the second audio content, the user would more likely use proportional silences less than 1× because he can speak English much more quickly. Again, the proportional silence pause files are positioned in the audio sequence before the second audio content phrase that the user will attempt to say or otherwise think about.

Determining Proportional Silence.

In addition to its function of modifying playback speed for audio file pairs, the tempo adjuster 144 can also be used to adjust duration of play for pause files, such as silence pauses that are placed between play of a first pair and play of a second pair of an audio file pair. Before adjusting duration of play, the tempo adjuster 144 must determine or otherwise be instructed as to the desired duration that a pause file is to be played. The following procedure can be used to determine durations for proportional silence pauses to be placed between the first audio content and the second audio content of audio file pairs. First, for each audio file pair the file size (such as the number of bytes of the file) is determined for a particular second audio content file. The file size is then multiplied by a constant factor and divided by the bit rate of the second audio content file to determine the duration in seconds of the second audio content file. The desired duration multiplication factor is then used to arrive at the desired duration for a silence pause file to be inserted between the first audio content and the second audio content during assembly to produce the audio sequence for a lesson.

Emphasis.

In some implementations, if the user selects to emphasize difficult to learn audio content pairs through the pattern selector 162 for a particular audio sequence, then the play pattern for the difficult to lean audio file pairs will be modified so that a focus phrase like "OK, you seem to have difficulty memorizing this phrase so really focus on this phrase coming up" would be played before each of the difficult audio content pairs in the audio sequence. After each of the difficult audio content pairs an ending emphasis phrase could be played such as "Ok, I hope you got that". Playing an end emphasis phrase indicates that the emphasis of the difficult phrase is completed.

Emphasis—Focus Beginning and End Phrases.

Focus beginning phrases and end phrases before and after each difficult audio content pair act as flags that go up before and after each difficult audio content pair that is to be emphasized. In some implementations of the focus phrases, only a beginning phrase is used, in other implementations only an ending phrase is used, and in other implementations both beginning and end phrases are used. The beginning phrase and end phrase in effect are end posts in time during play of an audio sequence that bound a difficult audio content pair.

The audio instruction system 100 can store different phrases to be used as focus beginning and end phrases in the miscellaneous file storage 136. The beginning and end phrases can then be picked according to some sort of order by the user through the pattern selector 162 or by an automated approach through the selection queue 140 when emphasis for difficult audio content pairs is desired. Through the pattern selector 162 a user can select to use focus phrases for a select number of rounds of play of the audio content pairs in an audio sequence rather than using focus phrases for all rounds of play of the audio sequence. Alternatively, difficult audio content pairs can be emphasized by using different play patterns without use of the focus phrases.

In some implementations, a user can use the pattern selector 162 to select a certain maximum number or maximum percentage of audio content pairs that can be emphasized through use of focus phrases or different play patterns. In some of the implementations, the selection queue 140 will then seek to allocate emphasis to the determined number of audio content pairs throughout the play rounds in a particular audio sequence.

The audio instruction system 100 uses test results contained in the test records storage 168 to determine what audio content pairs of a particular audio collection are relatively difficult so that emphasis can be applied to the particular audio content pairs of the audio collection when selected audio file pairs from the audio collection are assembled into an audio sequence. Consequently, the audio instruction system 100 cannot automatically incorporate emphasis into an audio sequence unless a user involved has already taken at least one test associated with the audio collection from which the audio sequence is going to be assembled.

The test records storage 168 can contain difficulty rankings of various audio content pairs of a particular audio collection based upon previous tests of a user for the audio collections. The rankings can be based directly upon test scores for the various audio content pairs or also upon other factors known about the audio content pairs. A user can also use the pattern selector 162 to manually select certain audio content files with in a content collection to be emphasized for a particular assembly of the content collection into an audio sequence even when a test has not been previously taken by the user regarding the audio collection of interest.

Although in general, test results stored in the test records storage 168 can be used to automate selection of audio file pairs to be emphasized in assembly of an audio sequence, there can be many different approaches to determining which of the audio content files are difficult enough for a particular used to be emphasized. A few exemplary approaches described below for purposes of illustration and are not intended to limit the approaches used by the instruction system 100 for automating selection audio content files for emphasis in audio sequences.

A first approach for selecting audio file pairs to be emphasized in assembly of an audio sequence is based upon the number of times the second audio content of a audio content pair cannot be answered in a test. A drawback to this approach is that it is limited in distinguishing the relative level of difficulty of various audio content pairs used within the same audio sequence lesson so is limited in selecting audio file pairs to emphasize.

A second approach for selecting which audio file pairs of an audio collection are difficult for a user and thus deserve emphasis is to track how the user responds to presentation of the first audio content of an audio content pair within a test. Included as possibilities of response are the following: if the user clicks "I don't know," immediately, if the user runs out of time answering a phrase, and the length of time it takes a user to answer a phrase relative to the amount of time it should take to answer a phrase. Table 2 summarizes how test results containing these responses could be evaluated to arrive at difficult rankings for purposes of determining degree of difficulty for a particular audio content pair of an audio collection.

TABLE 2

| User's Response | Time Properties | Difficulty Rank |
| --- | --- | --- |
| I don't know | NA | +1 |
| I know, answer is wrong | NA | +2 |
| I know, answer is right | 5x <= y | +3 |
| I know, answer is right | 4x <= y < 5x | +4 |
| I know, answer is right | 3x <= y < 4x | +5 |
| I know, answer is right | 2x <= y < 3x | +6 |
| I know, answer is right | 1x <= y < 2x | +7 |
| I know, answer is right | y < 1x | +8 |

Here y is the duration of time between question phrase exposure and hitting the "I know" key, that is, the duration of time it takes the question phrase to be read aloud by the computer. In Table 2, 1x-5x in Time Properties is a representation of how long the answer phrase takes. For instance, if the first audio content question phrase was "One" and the second audio content answer phrase could be "Uno" for a Spanish instruction audio content pair. If "Uno" takes $^2\!/_{10}$ of a second to say then 1x would be equal to $^2\!/_{10}$ of a second and 5x would be equal to one second.

A third approach gives the user at the end of a test an option of ranking the audio content pairs in order of difficulty by clicking the audio content pairs that were answered incorrectly during the test. This information is saved and then the user can use the emphasize function to flag this phrase in the lesson.

An example of how an emphasized phrase changes an audio file pair interval setting and audio sequence lesson. An illustrative audio sequence lesson called X has ten audio content pair phrases as listed in the Table 3.

TABLE 3

| Phrase # | English | Spanish |
|---|---|---|
| 1 | One | Uno |
| 2 | Two | Dos |
| 3 | Three | Tres |
| 4 | Four | Cuatro |
| 5 | Five | Cinco |
| 6 | Six | Seis |
| 7 | Seven | Siete |
| 8 | Eight | Ocho |
| 9 | Nine | Nueve |
| 10 | Ten | diez |

Furthermore with the example, a user chose to listen to the lesson through the pattern selector 162 using a simple interval setting as described in Table 4 where 2SOS stands for two seconds of silence. Also, in this simple setting there is three seconds of silence between each audio content pair and four seconds of silence between each round. This simple interval setting has no emphasis.

TABLE 4

| Round 1 | Round 2 | Round 3 |
|---|---|---|
| English | English | English |
| 2SOS | 2SOS | 2SOS |
| Spanish | Spanish | Spanish |

Continuing the example, after the user has listened to the audio sequence lesson assembled by the audio sequence assembler 122 based upon the simple interval setting, the user takes the first test for the related audio collection and obtains results as summarized in Table 5.

TABLE 5

| Phrase # | English | Spanish | Actual Duration of Phrase | test Duration of Phrase | Button | Rank |
|---|---|---|---|---|---|---|
| 1 | One | Uno | 6/10 | 4/10 | Right | +8 |
| 2 | Two | Dos | 6/10 | 6/10 | Right | +7 |
| 3 | Three | Tres | 6/10 | 4/10 | Right | +8 |
| 4 | Four | Cuatro | 8/10 | 8/10 | Don't know | +1 |
| 5 | Five | Cinco | 8/10 | 17/10 | Right | +6 |
| 6 | Six | Seis | 6/10 | 20/10 | Right | +5 |
| 7 | Seven | Siete | 8/10 | 10/10 | Don't know | +1 |
| 8 | Eight | Ocho | 8/10 | 10/10 | Wrong | +2 |
| 9 | Nine | Nueve | 8/10 | 17/10 | Wrong | +2 |
| 10 | Ten | diez | 6/10 | 8/10 | Wrong | +2 |

Continuing the example, at the end of the test, the user has the option of clicking on the phrases that were wrong and also ranking them being summarized in Table 6 in which three of five wrong audio content pair phrases were ranked.

TABLE 6

| Wrong Phrases | | | Difficulty ranking |
|---|---|---|---|
| 4 | Four | Cuatro | |
| 7 | Seven | Siete | 3 |
| 8 | Eight | Ocho | |
| 9 | Nine | Nueve | 1 |
| 10 | Ten | diez | 2 |

Table 7 contains what the automated rankings produced by the testing module 152 of the test results.

TABLE 7

| 4 | Four | Cuatro | Don't know | +1 |
|---|---|---|---|---|
| 7 | Seven | Siete | Don't know | +1 |
| 8 | Eight | Ocho | Wrong | +2 |
| 9 | Nine | Nueve | Wrong | +2 |
| 10 | Ten | diez | Wrong | +2 |

In this approach, the rankings by the user override the automated rankings by the testing module 152 so that the new ranking starts with 3 of the users phrases are shown in Table 8.

TABLE 8

| 9 | Nine | Nueve | 1 |
|---|---|---|---|
| 10 | Ten | diez | 2 |
| 7 | Seven | Siete | 3 |

Rankings shown in Table 9 are the remaining results of automated rankings by the testing module 152.

TABLE 9

| 4 | Four | Cuatro | Don't know | +1 |
|---|---|---|---|---|
| 8 | Eight | Ocho | Wrong | +2 |

In observing the results of this example, since the user's last ranking was the phrase "seven" and the ranking the user gave was "3" this approach adds the user's self ranking of 3 to the +1 that is determined by the testing module 152 and get an overall ranking of 4. The approach also adds the user's self ranking of 3 to the automated ranking of +2 and get an overall ranking of 5. Note that the "+" is used because the number to the right of the "+" is added to the last ranking the user makes at the end of the test. Note that if Four and Eight both were +2, then they would both be ranked 5. In the case where two audio content pair phrases have the same rank number, one of them is placed ahead of the other is ranking priority on some ordered basis such as random order.

The resulting rankings of this approach to be stored in the test records storage 168 are summarized in Table 10.

TABLE 10

| 9 | Nine | Nueve | 1 |
|---|---|---|---|
| 10 | Ten | diez | 2 |
| 7 | Seven | Siete | 3 |
| 4 | Four | Cuatro | 4 |
| 8 | Eight | Ocho | 5 |

Furthermore, if the user did not do the manual ranking at the end of the test, the automated rankings by the testing module 152 would be stored in the test records storage 168.

The approaches of ranking difficulty of audio file pairs can also be applied in selecting which of the audio file pairs of an audio collection to include in the selection queue 140 for assembly into an audio sequence. Through the user input module 126, the user can select a threshold of difficulty used to exclude some of the audio file pairs of an audio collection from inclusion into an audio sequence. For instance, a user may choose to only have audio file pairs to be included in an audio sequence that are very difficult for the user. On other occasions, the user may select only audio file pairs that the user already knows well to be included in an audio sequence. Other variations can also apply with these approaches.

For instance, the approaches can include an aging function that adds a ranking for an audio file pair based upon the duration of time since the audio file pair has been included for assembly into an audio sequence from the audio collection of which the audio file pair belongs. For instance, if an audio file pair has not been included for assembly into an audio sequence for a number of days over a certain threshold, the testing module 152 or the selection queue 140 could automatically include the audio file pair along with other audio file pairs from its audio collection for assembly into an audio sequence. An emphasis feature could be included such that each aged audio file pairs are emphasized with particular beginning files and/or ending files bounding the aged audio file pair to alert the user that the aged audio file pair has not been heard for a long time so that the user should be specially attentive.

User Interface Examples.

A series of exemplary user interfaces are presented below to illustrate some of the principles discussed above. The exemplary user interfaces are from an implementation of the instruction system 100 including particular implementations of the user input module 150, which are presented without limiting aspects discussed regarding the instruction system 100.

Figure 5:
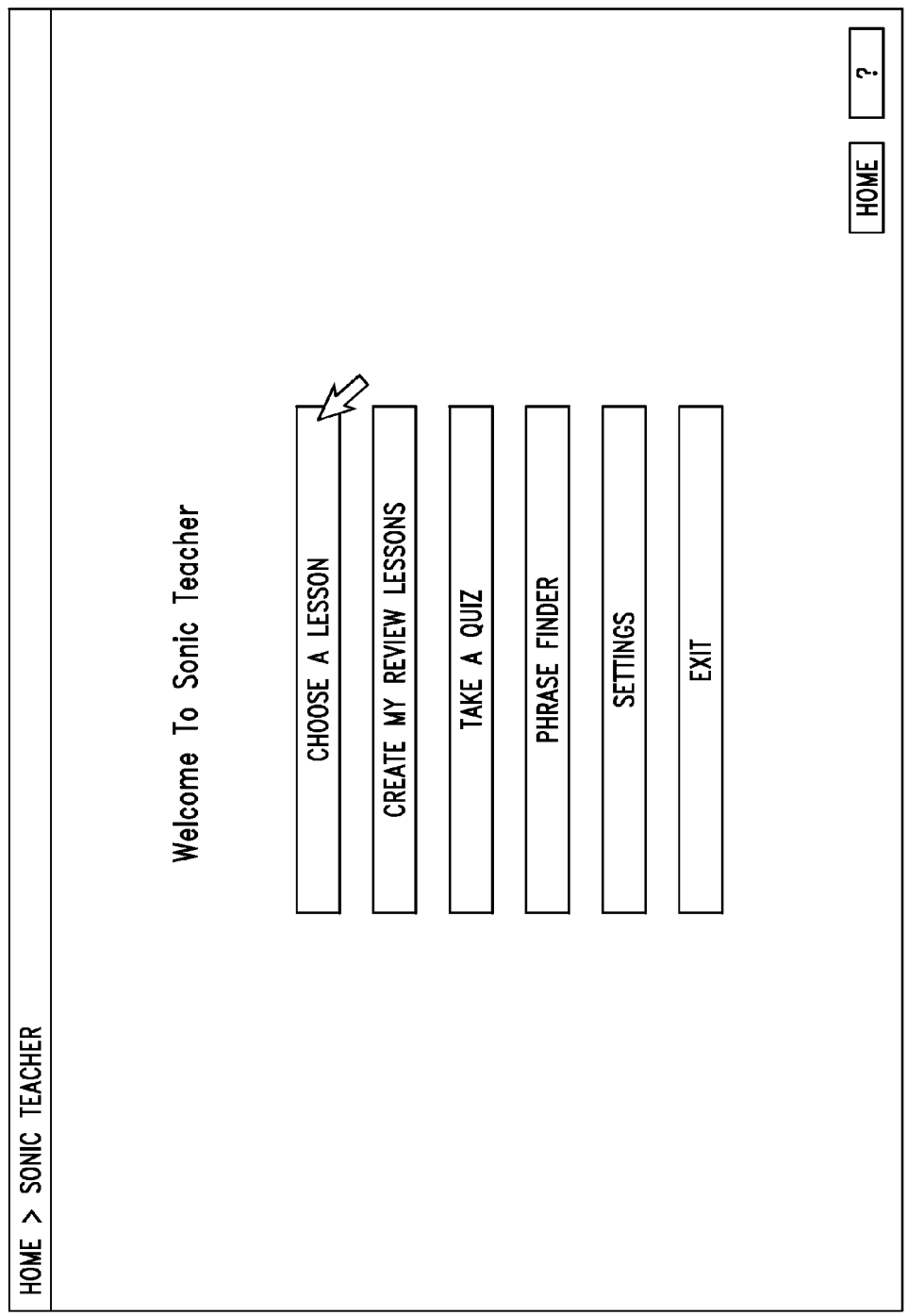
FIG. 5 is an illustration of a first depicted screen shot of an implementation of a portion of the adaptable audio instruction system.

As shown in FIG. 5, a menu selection can be used to start an audio sequence lesson based on an audio collection with the audio instruction system 100. For instance, after joining and paying for a web subscription to the audio instruction system 100, the user can start learning lessons supplied by the server 102 by clicking on "Choose a Lesson" located on the menu selection.

As shown in FIG. 6, audio collections to be assembled into audio sequence based lessons supplied by the audio instruction system 100 can be comprised of thematically grouped phrases as arranged according to the audio collections. In the case of "Words for Dating" there are words, sentences and phrases in both the user's native language (in this case English) as first audio content and the language the user wishes to learn (Spanish) as second audio content. Clicking on the "Words for Dating" lesson indicates the user's desire to learn about the vocabulary and phrases most commonly used in a dating situation. Since M/T is 0/11, it means that the user has memorized 0 phrases out of a total of 11 or 0%.

As shown in FIG. 7, the user input module 150 can provide a page that lists basic lesson information as well as the user's statistics with respect to this lesson (% memorized by user, etc). The page can also list the audio content pair phrases that are included in the audio collection for lessons.

Figure 8:
FIG. 8 is an illustration of a fourth depicted screen shot of an implementation of a portion of the adaptable audio instruction system.

As shown in FIG. 8, audio collections used as lessons can be studied in 3 different ways: As a regular printout where the native language is on one side of the sheet and the language to be learned is on the other; as a slideshow that shows the native phrase first and then the translated phrase (or vice versa); as assembled into an audio sequence as an MP3 file/audio file/custom pod cast. The terms MP3 file, audio file, custom pod cast refer to aspects of audio lessons that can be heard on electronic devices that have the capability of playing audio files.

Figure 9:
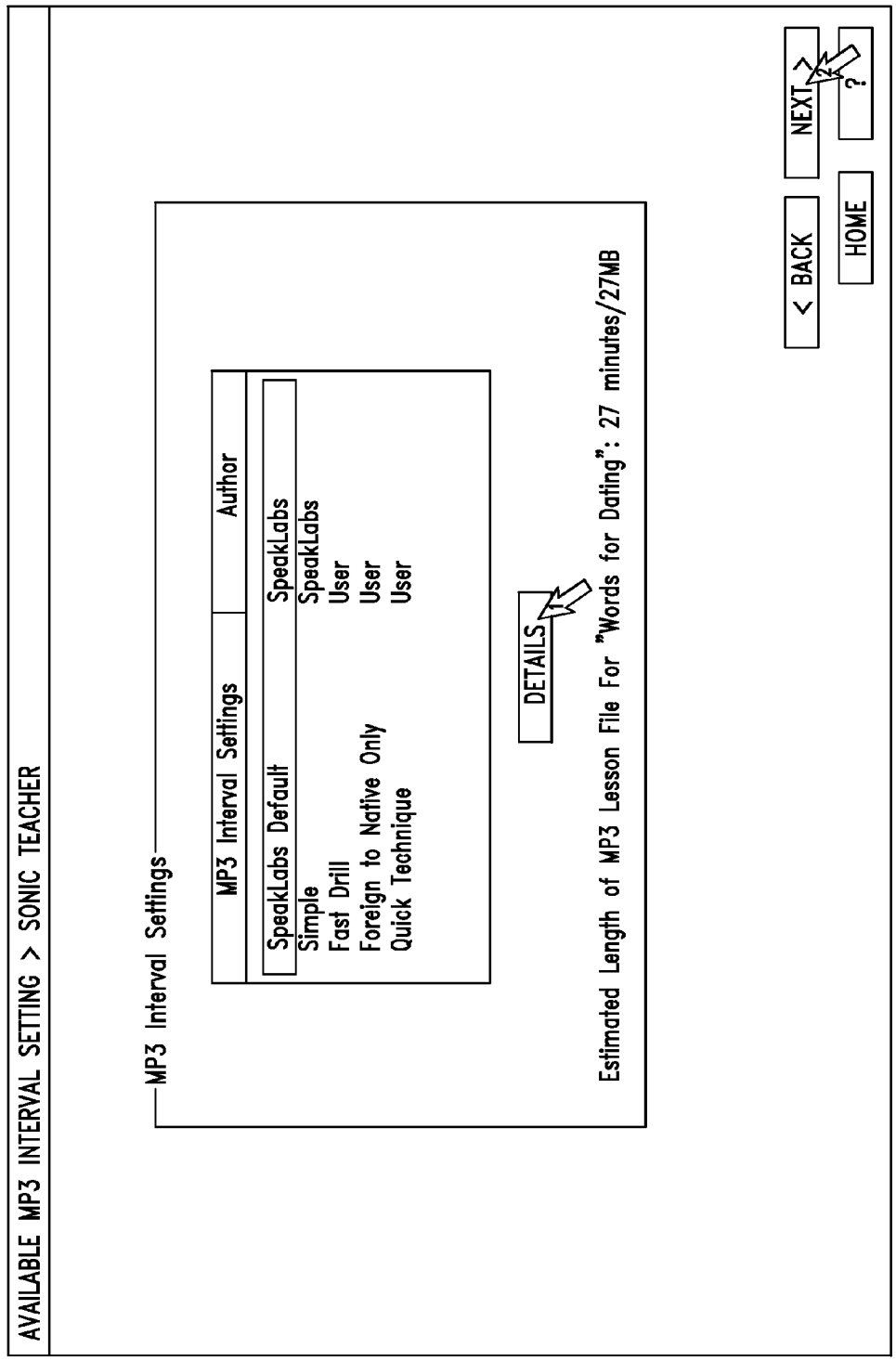
FIG. 9 is an illustration of a fifth depicted screen shot of an implementation of a portion of the adaptable audio instruction system.

As shown in FIG. 9, the user input module 150 can provide available MP3 Interval Settings. From here, the user must choose a sonic play pattern for the audio sequence assembler 122 to use to assemble an audio sequence for the user's lesson. As described above, a play pattern is the pattern in which the phrases to be learned are laid out in an audio file. One of the simplest patterns is one where the user hears an English phrase and then the Spanish translation phrase with one second in between the phrases.

Another pattern can be hearing the English once then the Spanish twice and then the English once more. Proportional silences between phrases can also be created so that after hearing a long English phrase, an interval of silence that is proportionately long when compared to the upcoming Spanish phrase, can be inserted so that the user has time to think of the appropriate Spanish translation right after he hears the English phrase.

Another play pattern can regard hearing the Spanish first, then hearing the Spanish again but at 50% (or some other percent) slower speed and then hearing the English. Hearing a slow version of a foreign phrase helps the user absorb complex material more easily. Finally, a play pattern could include a lead-in phrase like "Ok, pay attention to this next one coming up" that alerts the user a difficult phrase is about to be heard. The play patterns are very flexible. The user can control the type of play pattern the user wants to hear or even create personalized play patterns through the pattern customizer 154.

As shown in FIG. 10, the user input module 150 can provide capability to view interval settings. A grid is displayed on FIG. 10 regarding how phrases, silences and other lesson components will be put in place. In the depicted case, "Speaklabs Default" was chosen as the play pattern. Consequently, when the audio sequence is assembled by the audio sequence assembler 122, the user will hear all of the phrases in three rounds or iterations. In round one, the user will hear all of the depicted eleven phrases in the following pattern: English phrase, two seconds of silence, Spanish phrase. Then three seconds of silence (as indicated by "Seconds of Silence Between Different Phrases" at the bottom of FIG. 10). After hearing all eleven phrases in the audio sequence lesson, there will be four seconds of silence (as indicated by "Seconds of Silence Between Different Rounds").

The play pattern for round two will start but the play pattern is slightly different. The user will hear Spanish phrase, four seconds of silence, English phrase, and followed by there seconds of silence. After all eleven phrases are heard this way, the audio sequence file will then start playing Round Three.

The play pattern for round three starts with English phrase, the two seconds of silence, Spanish phrase, the one second of silence, then Spanish phrase again and then three seconds of silence. After all eleven phrases are heard again in this last pattern, the audio sequence lesson ends.

As shown in FIG. 11, the user input module 150 provides capability to create an audio sequence lesson file. The audio sequence lesson file is assembled according to the one or more play patterns indicated in the interval settings selected by the user as discussed above. The concatenator 146 of the instruction system 100 will string together individual audio files that have first audio content and second audio content from audio content pair files and from pause files and possibly from beginning and/or ending files and assemble them together to create one long audio sequence lesson file for the user to listen to. Once the assembly of the audio files into the audio sequence file is complete, the user can then download the single audio sequence file through the network 106 to their computer (such as network device 102) or to another electronic device that is capable of playing audio files.

Figure 12:
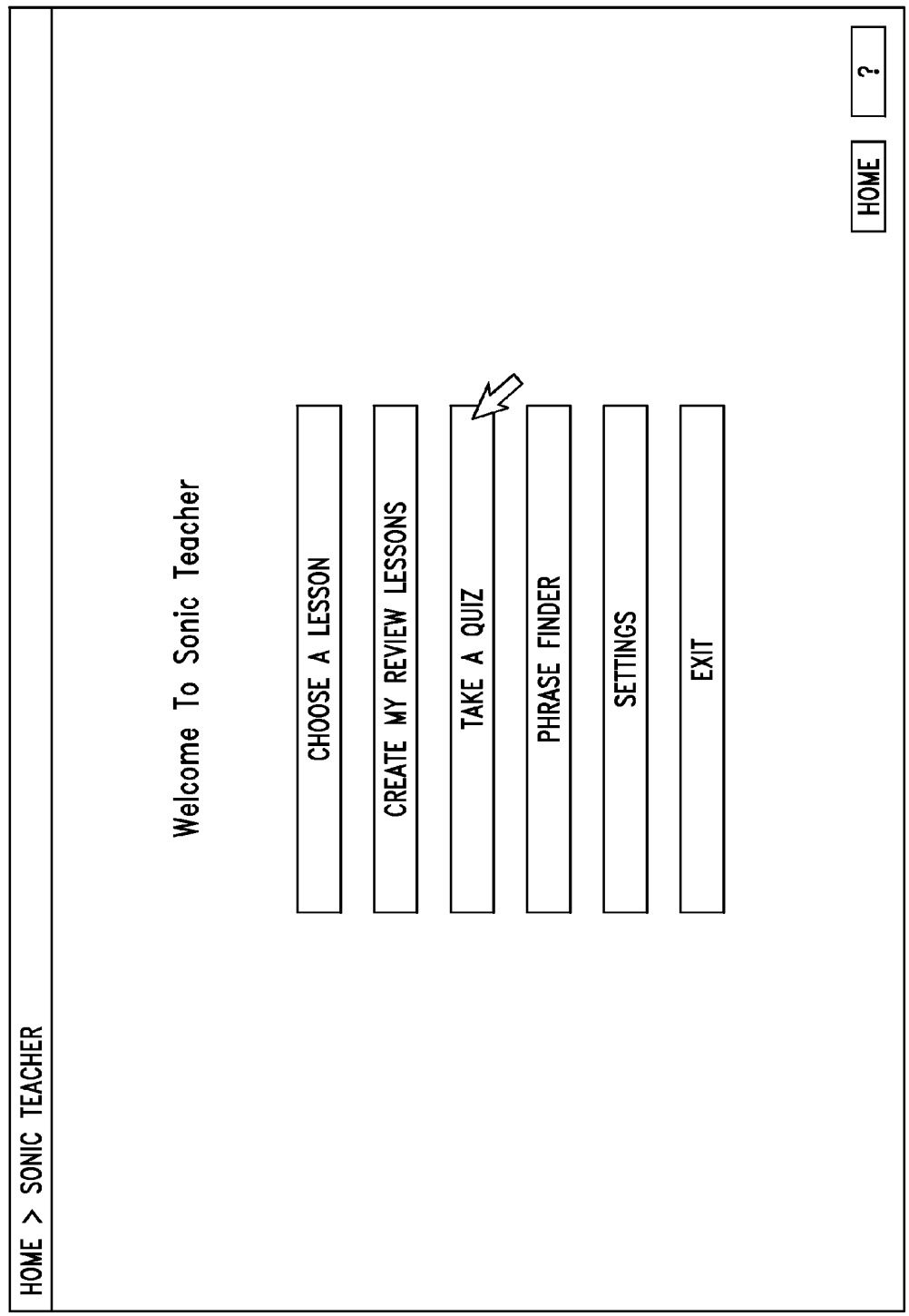
FIG. 12 is an illustration of an eighth depicted screen shot of an implementation of a portion of the adaptable audio instruction system.

As shown in FIG. 12, the user input module 150 provides capability for a user to take a test. After hearing an audio sequence lesson file assembled from an audio collection, the user can choose when to take a test on the material covered by the audio sequence lesson file and/or other material covered by the audio collection that may not have been assembled into the audio sequence lesson file. Taking a test lets the instruction system 100 know which phrases have been memorized and which have not. Additionally, tests let the instruction system 100 know which phrases are more difficult for the user to memorize. The results from a test are used to update the user's lessons so that any phrases that were memorized are automatically excluded from a future audio lesson file or slideshow.

As shown in FIG. 13, any audio sequence lesson that is started by a user is immediately eligible for testing. In the depicted case, the user will take a test on the "Words for Dating" lesson that the user started. Typically, the user will take a test on a lesson after the user has listened to and studied the lesson in any of the forms (audio sequence lesson file, slideshow or printout).

As shown in FIG. 14, a user can choose different options for testing. These options include selections as to test format, phrase ordering, timing of questions, and direction of content (English to Spanish or Spanish to English).

As shown in FIG. 15, the user input module 150 can include various aspects with testing. For instance, a user is shown a first phrase based on a first audio content pair and then has to decide whether or not the user knows the translation. If the user chooses, "I Don't Know" the instruction system automatically marks that phrase as "not memorized by the user" and shows the user the next phrase to be tested on. During the test, the instruction system 100 tracks how long it takes the user to answer either "I know" or "I don't know". Timing data can be saved in the test records storage 168 so that the instruction system 100 can rank phrases in a audio sequence lesson according to how quickly a user can recall the translated phrase. In this case, the user chooses "I know" and the instruction system times how long it took for the user to choose "I know" from the time the phrase "the first date" was initially exposed to the user.

As shown in FIG. 16, the user input module 150 can have capability such that after choosing "I know" the user will see and hear the answer phrase. If the user sees that the user is right, then the user can click "Right!" if not, the user can click "Wrong!". In either case, the instruction system 100 program marks the phrase as memorized if "Right!" is clicked and unmemorized if "Wrong" and stores this data in the test records storage 168.

As shown in FIG. 17, the user input module 150 can have capability such that typically during a test, a user will go through the entire test phrases and test himself on each phrase. However, the user can just click "Mark remaining as wrong and quit" to end the test early.

As shown in FIG. 18, the user input module 150 can have capability such that at the end of a test, the results are revealed to the user. The user can see which phrases were memorized and which weren't. The user can also rank in order of difficulty the phrases the user couldn't memorize (the phrases that were either marked as "I don't know" or "Wrong"). As discussed above, the user's ranking of difficulty helps the instruction system 100 program determine how difficult a phrase is relative to others.

Once the test data has been captured by the instruction system 100 and stored in the test records storage 168, the user can then choose that same "Words for Dating" audio collection again and to be assembled into a new updated audio sequence to be downloaded with the same or different play pattern. The difference this time is that the new audio sequence file will not have the phrase "the first date" in it because the user has already memorized that phrase. So, each time a user takes a test and indicates that he has successfully memorized a phrase, the audio file pair associated with that memorized phrase drops out of the audio sequence lesson to be assembled after the current testing for that user. As more and more phrases are memorized, the number of audio file pairs out of an audio collection used to assemble an audio sequence lesson file will become smaller. This "whittling" of the number of audio file pairs to be assembled into audio sequence lesson files by the user makes the audio instruction system 100 more dynamic and relevant to the user's educational needs.

Figure 19:
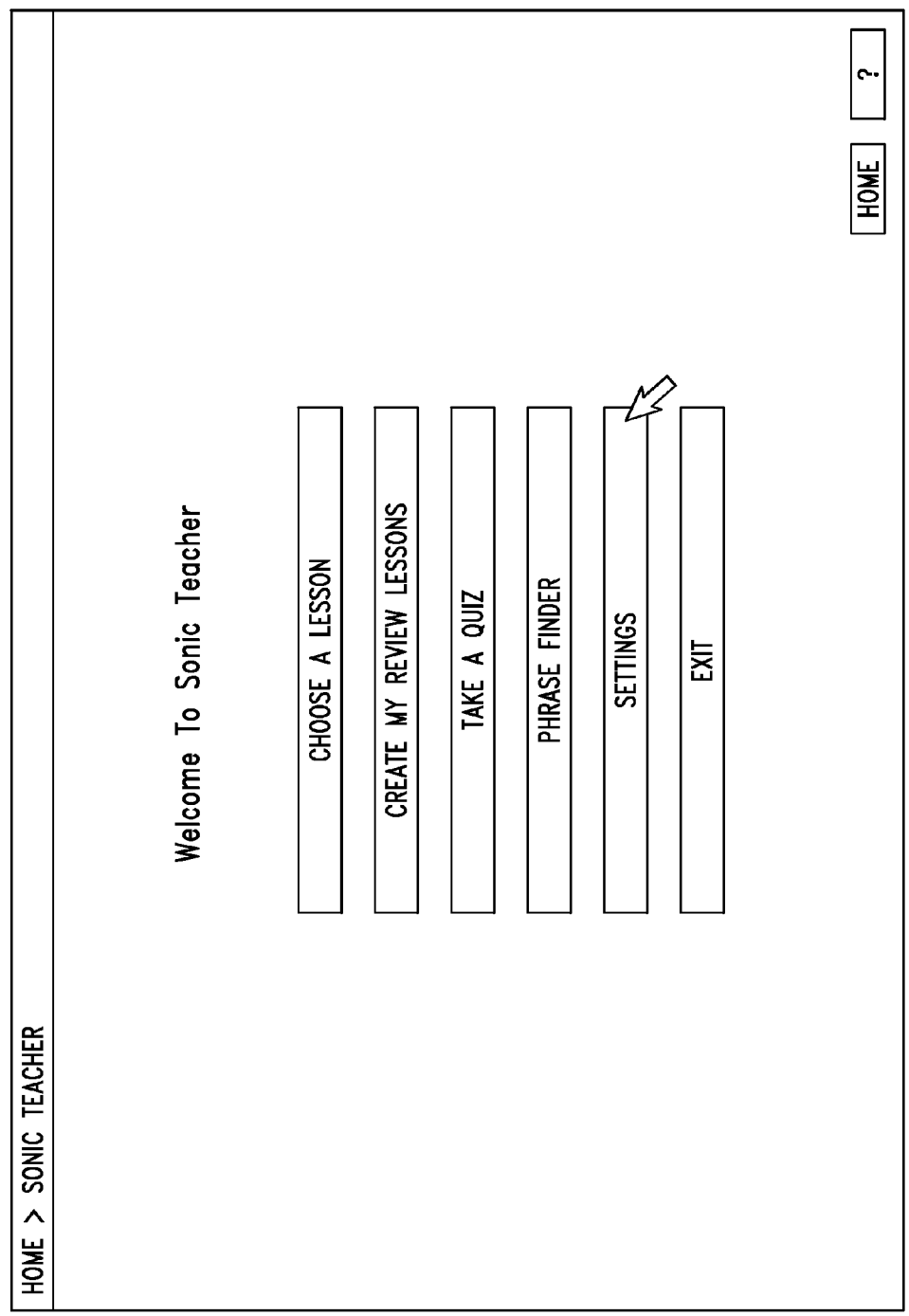
FIG. 19 is an illustration of a fifteenth depicted screen shot of an implementation of a portion of the adaptable audio instruction system.
Figure 20:
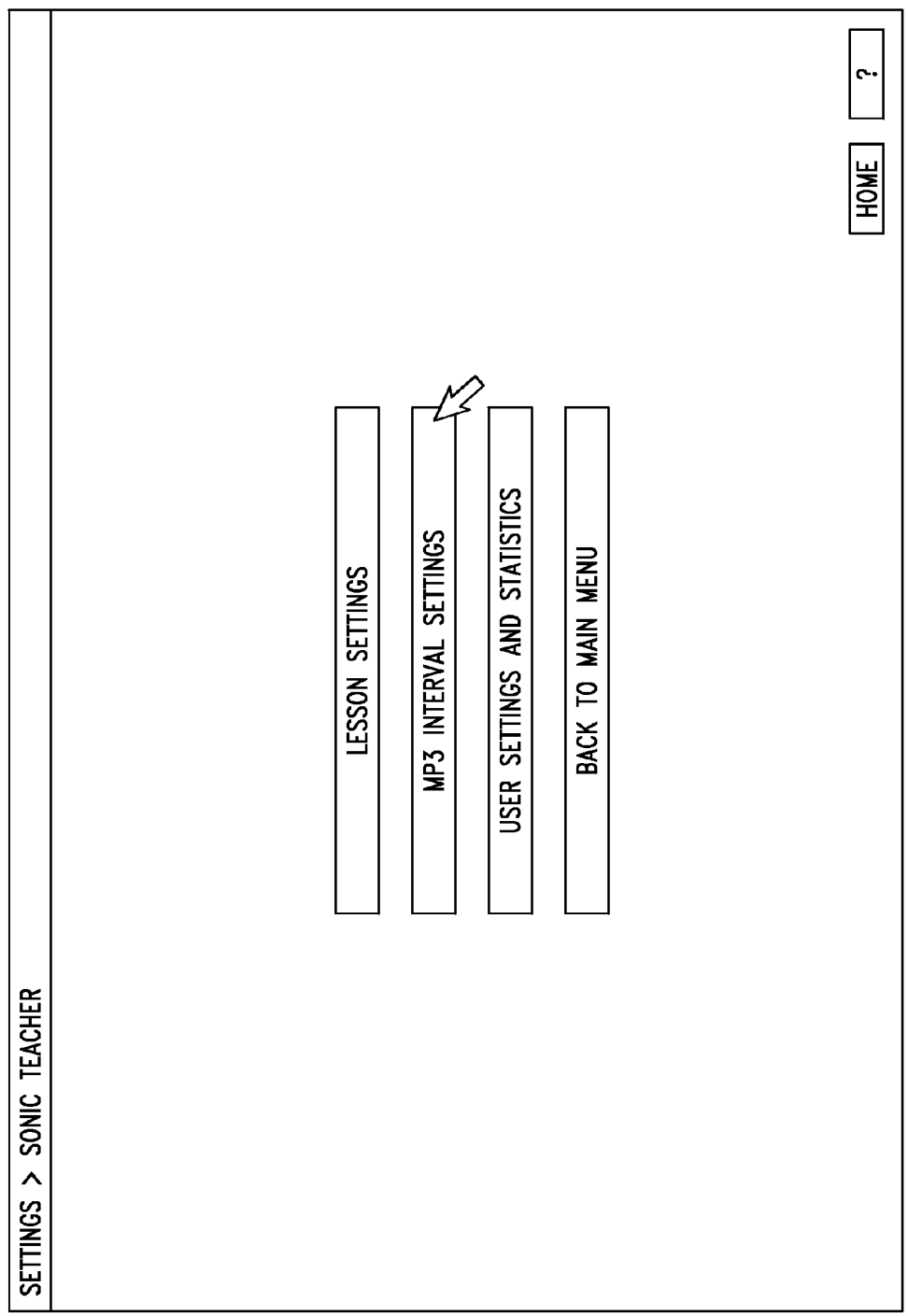
FIG. 20 is an illustration of a sixteenth depicted screen shot of an implementation of a portion of the adaptable audio instruction system.
Figure 21:
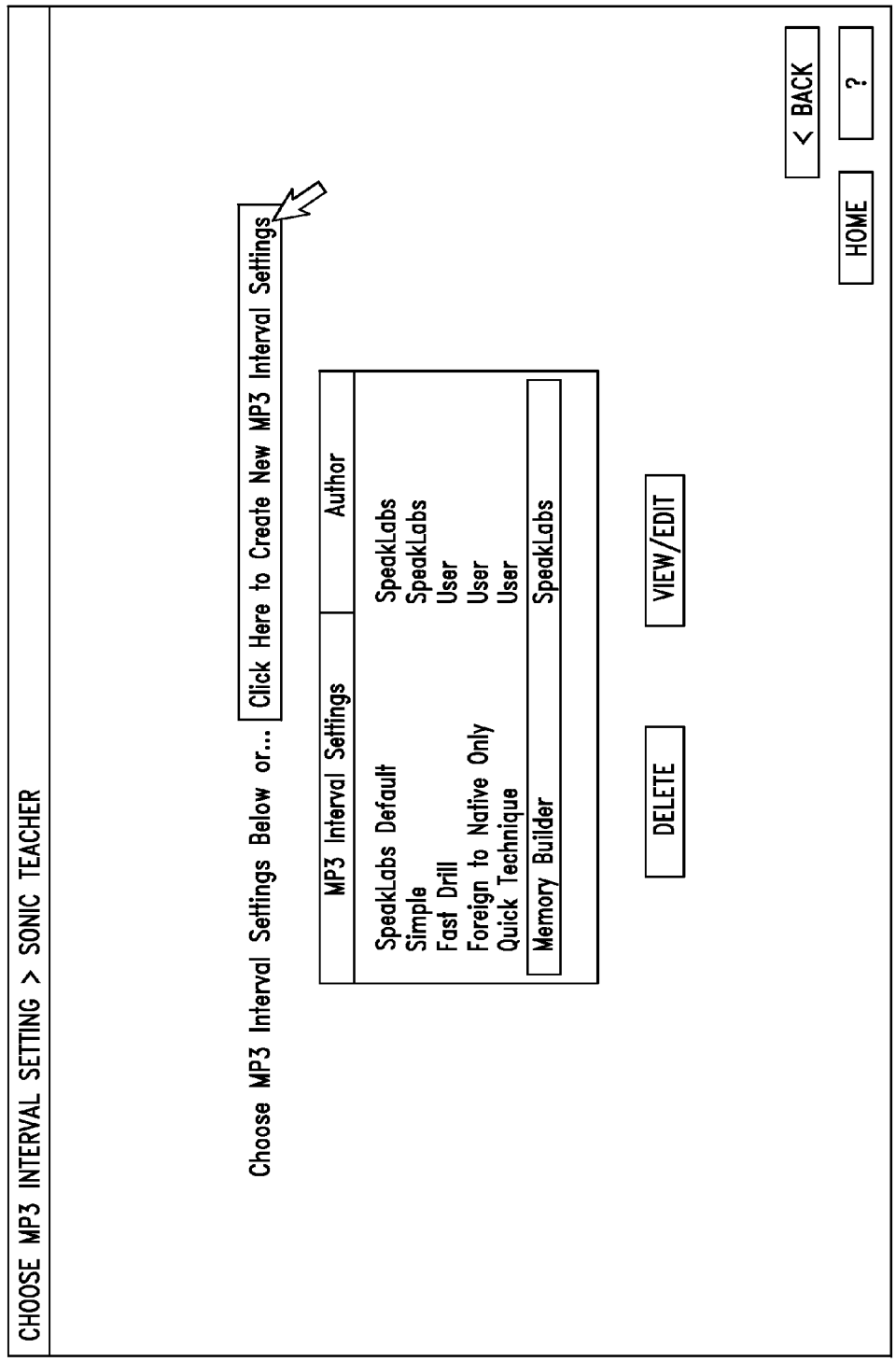
FIG. 21 is an illustration of a seventeenth depicted screen shot of an implementation of a portion of the adaptable audio instruction system.

As shown in FIG. 19, the user input module 150 can provide further settings capability for the user. Clicking on "Settings" gets the user to the settings menu. As shown in FIG. 20, clicking on "MP3 Interval Settings" gets the user to the MP3 Interval Settings area. As shown in FIG. 21, the user input module 150 can provide MP3 interval settings. The MP3 interval settings can control the play pattern that's applied to phrases that appear in an audio sequence lesson file.

As shown in FIG. 22, the user input module 150 can have capability for creation of new mp3 interval settings. Users can create their own play pattern in the "Create New MP3 Interval Settings" page. The page includes a grid that can be filled with different types of sounds. Each cell has a drop down list that will show the allowable sounds for that cell. The user can choose to shuffle the phrases the user wants to learn in different ways to make the audio lesson more challenging.

The user can also tell the instruction system 100 to create an audio sequence lesson file that emphasizes the phrases that the user is having the most trouble with. The emphasis could be a lead-in phrase like "Ok, listen carefully to the next phrase coming up" before the actual difficult phrase. This lead-in emphasis phrase acts as a flag to point the listener's attention to the upcoming tough phrase. Each element in the cells then provide the template/sonic pattern for the audio lesson.

Figure 23:
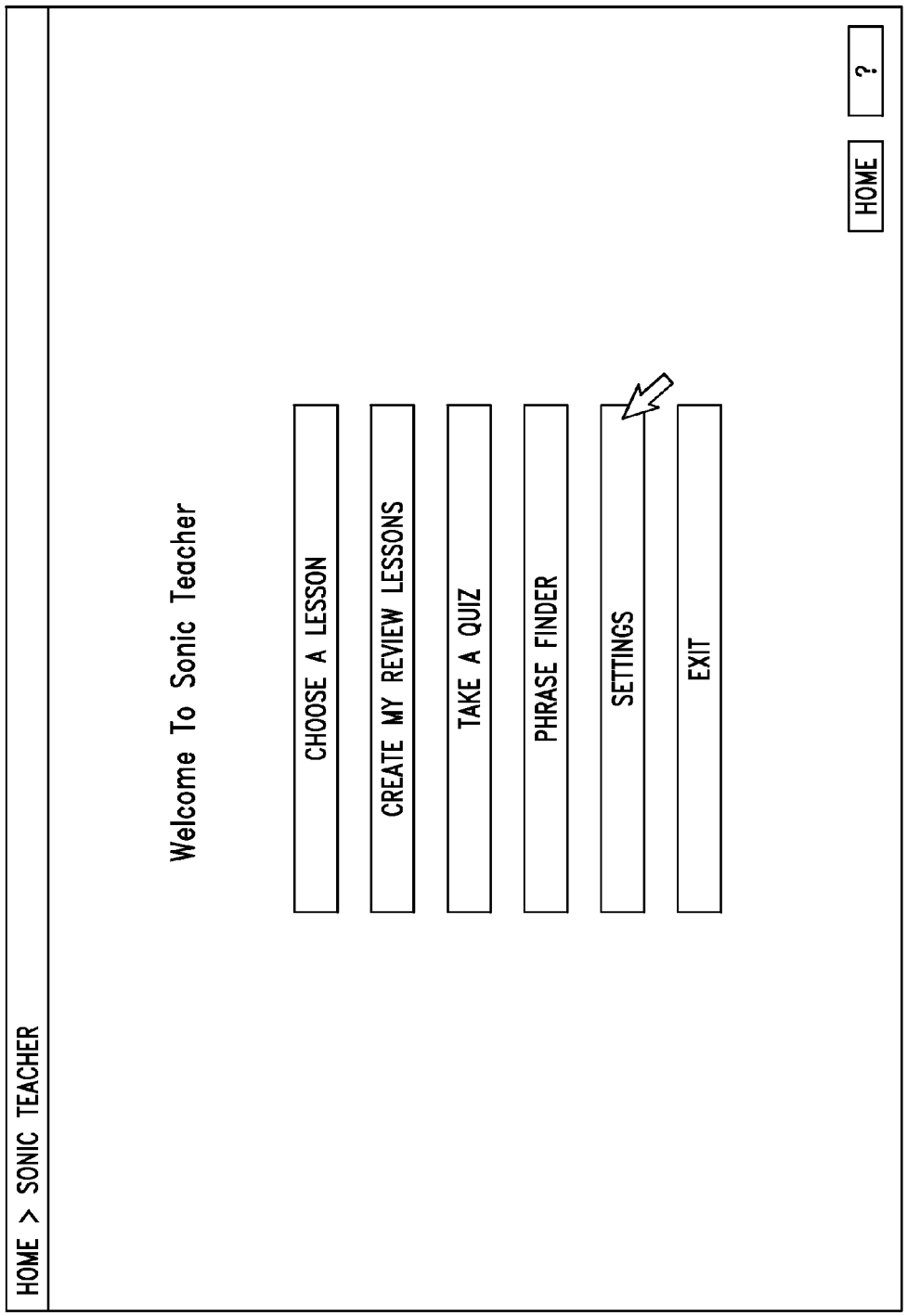
FIG. 23 is an illustration of a nineteenth depicted screen shot of an implementation of a portion of the adaptable audio instruction system.
Figure 24:
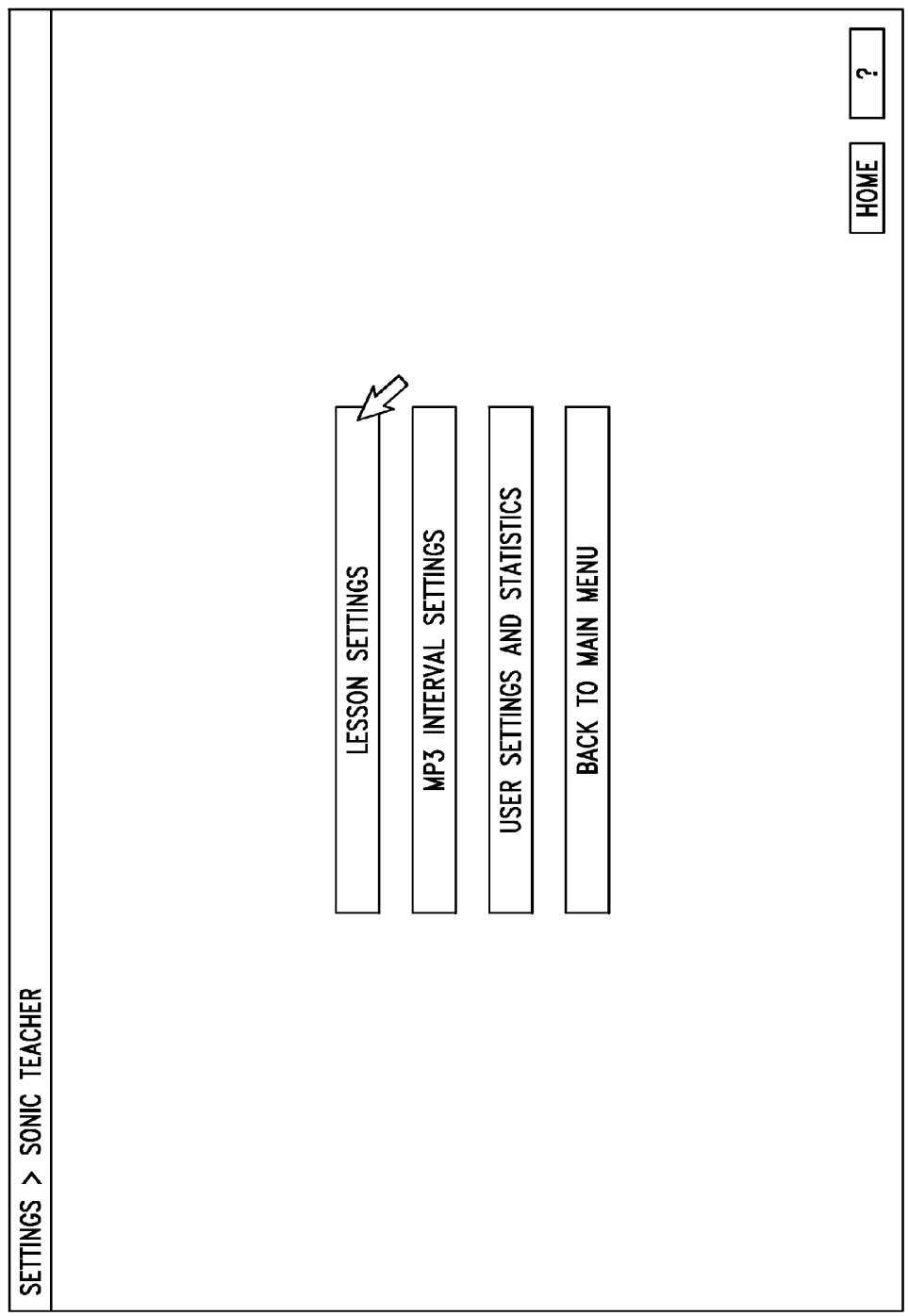
FIG. 24 is an illustration of a twentieth depicted screen shot of an implementation of a portion of the adaptable audio instruction system.

As shown in FIG. 23, the user input module 150 can have capability to provide further settings by clicking on "Settings" to get to the settings menu. As shown in FIG. 24, the user module 150 can have capability to provide further settings by clicking on "Lesson Settings" gets the user to the Lesson Settings menu.

As shown in FIG. 25, the user input module 150 can have capability to provide uploading service for a user. The user can type in the user's lesson information on the left side of the page. On the right side, the user can type in the actual content—with the native phrase on the left and the translated phrase on the right. Note that in this instance of the methodology of the instruction system 100 in action, the user speaks English and wishes to learn Spanish. This can change to be any two languages. The methodology isn't restricted to just learning a language. As long as there's information paired in a native language/translated language, question/answer, cue/response, flashcard question/flashcard answer format, etc, the methodology of the instruction system 100 can be applied to virtually anything a user wants to learn.

Figure 27:
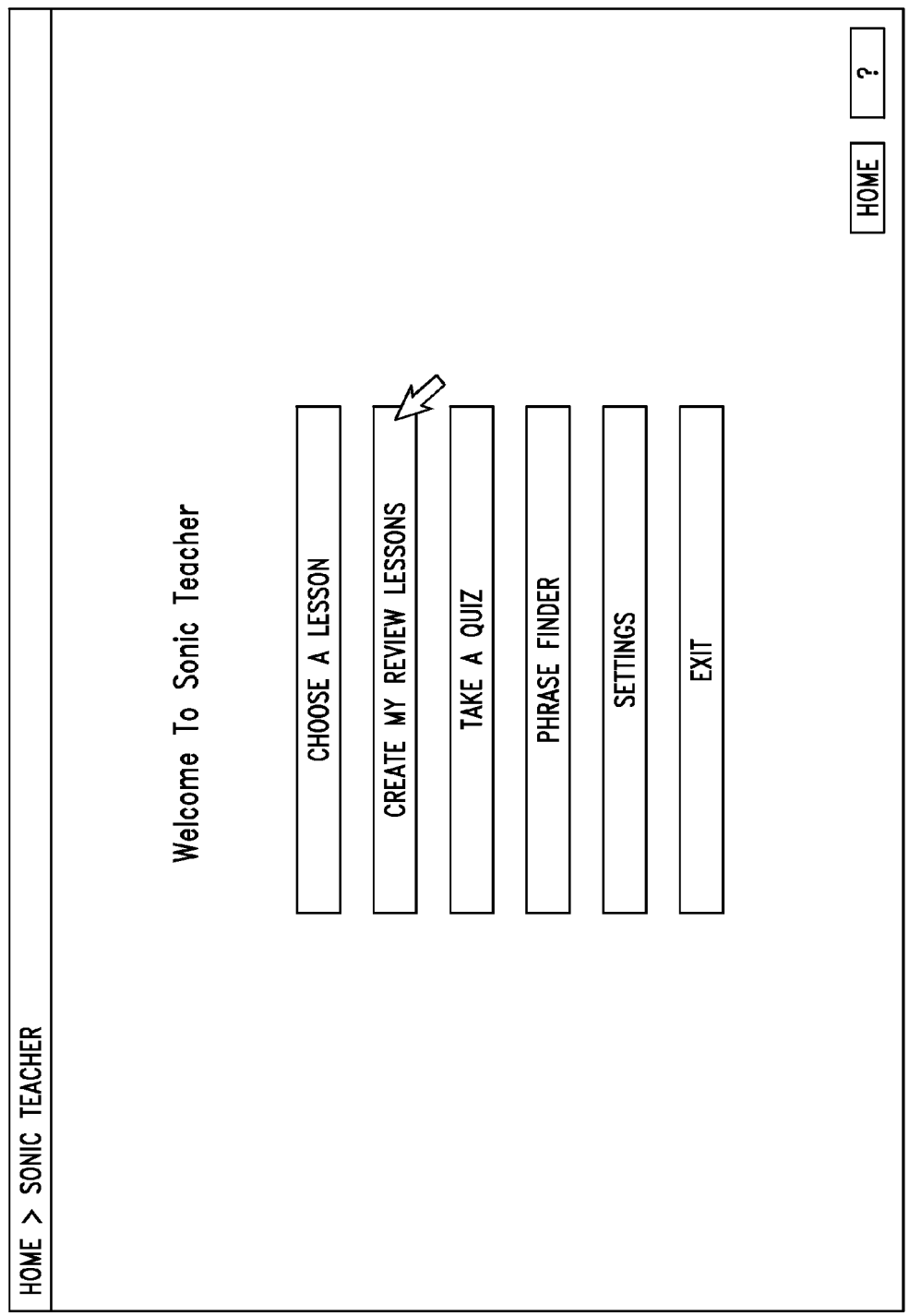
FIG. 27 is an illustration of a twenty third depicted screen shot of an implementation of a portion of the adaptable audio instruction system.

As shown in FIG. 26, the user input module 150 can provide visual indication of uploading of lesson content to a user. As shown in FIG. 27, the user input module 150 can provide access to a user to create a review lesson, which is an audio sequence lesson file assembled from audio pair files from an audio collection that has been used by the user in the past to first assemble an audio sequence lesson file.

As shown in FIG. 28, the user input module 150 can provide capability to a user to select certain review lesson parameters and to change the attributes of those parameters. The user can use the instruction system 100 to assemble an audio sequence file from an audio collection as a review lesson that is based on an original audio sequence lesson file initially assembled from the audio file pair of the audio collection and has been completed by the user. The instruction system 100 in creating the audio sequence review file will search through all of the audio pair files (phrases in this depicted case) within an audio collection and determine what audio pair files need to be reviewed. The instruction system 100 determines which of the audio pair files to use by sorting through appropriate test data stored in the test records storage h168 and by looking at such things as the number of times a phrase showed up in a test, how long it took for the user to act on a phrase once it was exposed to the user and the ranking of difficulty the user assigns to the phrase at the end of a test.

Figure 29:
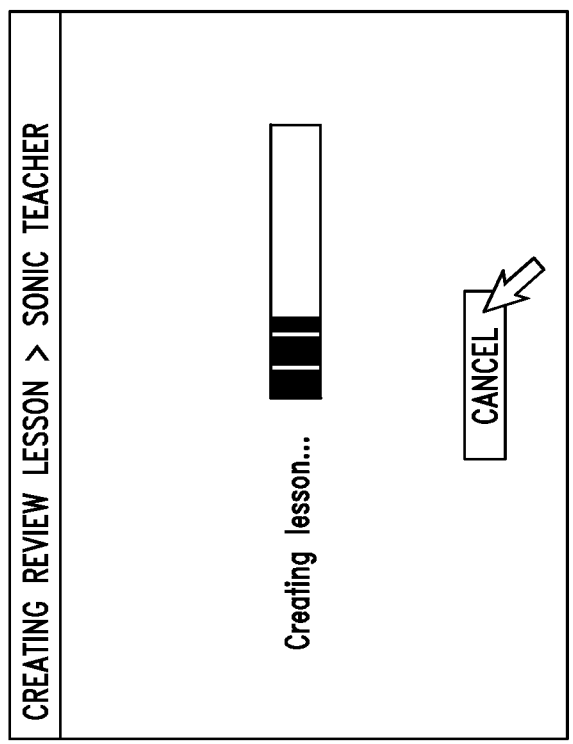
FIG. 29 is an illustration of a twenty fifth depicted screen shot of an implementation of a portion of the adaptable audio instruction system.

As shown in FIG. 29, the instruction system 100 will then assemble the audio sequence review lesson file. Once created, the user input module 150 will cause the audio sequence review lesson file to appear on a list viewable by the user as available lessons for the user.

Implementations can include a storage containing a plurality of audio files each containing a different audio content and a scope reducer configured to select a portion of the audio files from the plurality of audio files contained in the storage according to an arrangement of the portion of the audio files as a plurality of audio file pairs. Each audio file pair can have a different first audio file of the portion and a different second audio file of the portion. According to the arrangement, for each audio file pair, selection of one audio file of the audio file pair by the scope reducer as part of the portion can necessitate selection of the other audio file of the audio file pair by the scope reducer also as part of the portion. An audio sequence assembler can be configured to assemble the portion of the audio files selected by the scope reducer into a single audio sequence containing the audio content of each of the portion of the audio files, the audio content ordered according to a sequence of the audio file pairs of the portion of the audio files. Furthermore the single audio sequence can be contained in a single audio file. The scope reducer can be configured to select the portion of the audio files based upon user input. The scope reducer can be configured to select the portion of the audio files according to test records of at least one test taken by a user based on the audio content of the plurality of audio files. A testing module can be configured to generate tests based on selected audio content of the plurality of audio files and to store as the test records results of at least one of the tests taken by the user. The audio sequence assembler can be further configured to assemble the portion of the audio files according to at least one of a plurality of play patterns for the audio file pairs. At least a first one of the play patterns can require for each audio file pair a first sequence of play of the audio content of the audio file pair and at least a second one of the play patterns requires for each audio file pair a second sequence of play of the audio content of the audio file pair that is in reverse order to the first sequence of play. At least a first one of the play patterns can require for each audio file pair a first total number of times of play of the audio content of at least one of the audio files of the audio file pair and at least a second one of the play patterns requires for each audio file pair a second total number of times of play of the audio content of at least the one of the audio files of the audio file pair, the first total being unequal to the second total. For each of the audio file pairs, the audio content of the first audio file and the second audio file can include at least one of the following: a word in a first language and the word in a second language, respectively, a term in a first language and a term in a second language respectively, a question and an answer, respectively, and a cue and a response, respectively.

Implementations can include a storage containing a plurality of audio files each containing a different audio content. A pattern selector can be configured to provide a plurality of play patterns one of which to be selected for a first round of play of audio content from each of a plurality of audio file pairs of the plurality of audio files. Each audio file pair of the plurality of audio file pairs can have a different first audio file of the plurality of audio files and a different second audio file of the plurality of audio files, for each audio file pair. The selected one of the plurality of play patterns for the audio file pair can indicate which audio content of the first audio file and the second audio file is to be played in the first round for a first instance and which audio content of the first audio file and the second audio file is to be played in the first round for a second instance. The first instance can be to occur in the first round in an audio sequence before the second instance occurs. The plurality of play patterns can include a first play pattern requiring the audio content of the first audio file to be played for the first instance and a second play pattern requiring the audio content of the second audio file to be played for the first instance. An audio sequence assembler can be configured to assemble the plurality of the audio files into a single audio sequence containing at least the first round of the audio content of each of the plurality of audio files. The first round of the audio content for each of the audio file pairs can be ordered at least in part according to the audio sequence of the selected one of the plurality of play patterns for the audio file pair. The single audio sequence can be contained in a single audio file. The pattern selector can be further configured to provide the plurality of play patterns to include a plurality of play tempos, at least one of which to be selected for play of the audio content of each of the audio file pairs. The pattern selector can be further configured to provide the plurality of play patterns to include audio content of a pause file to be placed by the audio sequence assembler between the audio content of the first audio file and the second audio file of each of the audio file pairs. The audio content of the pause file can be substantially silence. The audio content of the pause file can have a fixed duration of play. The audio sequence assembler can include a tempo adjuster. The tempo adjuster can be configured to adjust duration of play of the audio content of the pause file for each of the audio file pairs based upon a duration of play of the audio content of at least one of the first audio file and the second audio file of the audio file pair. The pattern selector can be further configured to provide the plurality of play patterns to include audio content of a pause file to be placed by the audio sequence assembler between the audio content of each of two audio file pairs consecutively spaced in the single audio sequence. The pattern selector can be further configured to provide the plurality of play patterns to include audio content of an emphasis file to be placed by the audio sequence assembler between the audio content of each of two audio file pairs consecutively spaced in the single audio sequence.

Implementations can include a storage containing a plurality of audio files each containing a different audio content. A pattern selector can be configured to provide a plurality of play patterns one of which to be selected for a first round of play of a plurality of audio file pairs of the plurality of audio files. Each audio file pair of the plurality of audio file pairs can have a different first audio file of the plurality of audio files and a different second audio file of the plurality of audio files. For the plurality of audio file pairs, the selected one of the plurality of play patterns can indicate for each of the audio file pairs which audio content of the first audio file and the second audio file is to be played in the first round for a first instance and which audio content of the first audio file and the second audio file is to be played in the second round for a second instance. The first instance can occur in an audio sequence before the second instance occurs, the plurality of play patterns to include a first play pattern requiring the audio content of the first audio file to be played for the first instance and a second play pattern requiring the audio content of the second audio file to be played for the first instance. An audio sequence assembler can be configured to assemble the plurality of the audio files into a single audio sequence containing at least the first round of the audio content of each of the plurality of audio files. The first round of the audio content for each of the audio file pairs can be ordered at least in part according to the audio sequence of the selected one of the plurality of play patterns for the plurality of audio file pairs. The single audio sequence can be contained in a single audio file.

Implementations can include a storage containing a plurality of audio files each containing a different audio content. A pattern selector can be configured to provide a plurality of play patterns one of which to be selected for each of a plurality of audio file pairs of the plurality of audio files. Each audio file pair of the plurality of audio file pairs can have a different first audio file of the plurality of audio files and a different second audio file of the plurality of audio files. For each audio file pair, the selected one of the plurality of play patterns for the audio file pair can contain an audio sequence indicating how many times the audio content of the first audio file and how many times the audio content of the second audio file is to be played for a first round of play of the audio file pair. The plurality of play patterns can include a first play pattern requiring the audio content of the first audio file to be played for a total of one time for the first round of play of the audio file pair and a second play pattern requiring the audio content of the first audio file to be played for a total of more than one time for the first round of play of the audio file pair. An audio sequence assembler can be configured to assemble the plurality of the audio files into a single audio sequence containing the audio content of each of the plurality of audio files, the audio content for each of the audio file pairs ordered at least in part according to the audio sequence of the selected one of the plurality of play patterns for the audio file pair. The single audio sequence can be contained in a single audio file. The audio sequence assembler can be configured to assemble the single audio sequence such that the first rounds of play of the plurality of audio file pairs are to be played sequentially.

Implementations can include a storage containing a plurality of audio files each containing a different audio content. A pattern selector can be configured to provide a plurality of play patterns one of which to be selected for a plurality of audio file pairs of the plurality of audio files. Each audio file pair of the plurality of audio file pairs can have a different first audio file of the plurality of audio files and a different second audio file of the plurality of audio files. For the plurality of audio file pairs, the selected one of the plurality of play patterns can contain an audio sequence indicating how many times the audio content of the first audio file and how many times the audio content of the second audio file is to be played for a first round of play of the audio file pair. The plurality of play patterns can include a first play pattern requiring the first audio file to be played for a total of one time for the first round of play of the audio file pair and a second play pattern requiring the first audio file to be played for a total of more than one time for the first round of play of the audio file pair. An audio sequence assembler can be configured to assemble the plurality of the audio files into a single audio file containing the audio content of each of the plurality of audio files. The audio content for each of the audio file pairs can be ordered at least in part according to the audio sequence of the selected one of the plurality of play patterns for the plurality of audio file pairs. The single audio sequence can be contained in a single audio file. The audio sequence assembler can be configured to assemble the single audio sequence such that the first rounds of play of the plurality of audio file pairs are to be played sequentially.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system comprising:
a first storage containing a plurality of audio files each containing a different audio content, the plurality of audio files comprising a plurality of audio file pairs, each audio file pair having a different first audio file of the plurality of audio files and a different second audio file of the plurality of audio files, the plurality of audio file pairs having a predefined pair order;
a second storage storing a plurality of different predefined play patterns unassociated with the plurality of audio files, each of the plurality of predefined play patterns comprising a first instance occurring before a second instance, and indicating a play order for audio content of the first and second audio files of each of the plurality of audio file pairs, the play order being the same for each of the plurality of audio file pairs, the audio content of both the first and second audio files of each of the plurality of audio file pairs to be played at least once within the play order, the plurality of predefined play patterns to include a first play pattern indicating that the audio content of the first audio file is to be played for the first instance and a second play pattern indicating that the audio content of the second audio file is to be played for the first instance;
a pattern selector configured to select first and second ones of the plurality of predefined play patterns, the first selected predefined play pattern being different from the second selected redefined play pattern; and
an audio sequence assembler configured to automatically assemble the plurality of audio file pairs into a single audio sequence after the first and second selected predefined play patterns have both been selected, the single audio sequence comprising a first round followed without user intervention by a second round, the first round comprising the plurality of audio file pairs ordered in accordance with the play order of the first selected predefined play pattern, the second round comprising the plurality of audio file pairs ordered in accordance with the play order of the second selected predefined play pattern, the plurality of audio file pairs in at least one of the first and second rounds being also ordered in accordance with the redefined air order.

2. The system of claim 1 wherein the single audio sequence is contained in a single audio file.

3. The system of claim 1 wherein each of the plurality of predefined play patterns includes a play tempo.

4. The system of claim 1 wherein each of the plurality of predefined play patterns identifies audio content of a pause file to be played between successive audio content in the play order of the predefined play pattern.

5. The system of claim 4 wherein the audio content of the pause file is substantially silence.

6. The system of claim 4 wherein the audio content of the pause file has a fixed duration of play.

7. The system of claim 4 wherein the audio sequence assembler includes a tempo adjuster, the tempo adjuster configured to adjust duration of play of the audio content of the pause file for each of the audio file pairs based upon a duration of play of the audio content of at least one of the first audio file and the second audio file of the audio file pair.

8. The system of claim 1 wherein each of the plurality of predefined play patterns identifies audio content of a pause file to be placed by the audio sequence assembler after each of the plurality of audio file pairs in the predefined pair order.

9. The system of claim 1 wherein each of the plurality of predefined play patterns identifies audio content of an emphasis file to be placed by the audio sequence assembler before each of the plurality of audio file pairs in the predefined pair order.

10. The system of claim 1, wherein each of the plurality of predefined play patterns indicates how many times the audio content of the first audio file and how many times the audio content of the second audio file is to be played, and
the plurality of predefined play patterns include a third play pattern indicating that the audio content of the first audio file is to be played for a total of one time, and a fourth play pattern indicating that the audio content of the first audio file is to be played for a total of more than one time for the first round of play of the audio file pair.

11. The system of claim 10 wherein the third play pattern is one of the first play pattern and the second play pattern.

12. The system of claim 11 wherein the fourth play pattern is one of the first play pattern and the second play pattern, and the fourth play pattern is different from the third play pattern.

13. The system of claim 1, wherein the audio sequence assembler fully assembles the single audio sequence before playback of the single audio sequence is initiated.

14. A method comprising:
storing, on a computing device, a plurality of audio files each containing a different audio content, the plurality of audio files comprising a plurality of audio file pairs, each audio file pair having a different first audio file of the plurality of audio files and a different second audio file of the plurality of audio files, the plurality of audio file pairs having a predefined pair order;
storing, on the computing device, a plurality of different predefined play patterns unassociated with the plurality of audio files, each of the plurality of predefined play patterns comprising a first instance occurring before a second instance, and indicating a play order for audio content of the first and second audio files of each of the plurality of audio file pairs, the play order being the same for each of the plurality of audio file pairs, the audio content of both the first and second audio files of each of the plurality of audio file pairs to be played at least once within the play order, the plurality of predefined play patterns to include a first play pattern indicating that the audio content of the first audio file is to be played for the first instance and a second play pattern indicating that the audio content of the second audio file is to be played for the first instance;
receiving, by the computing device, selections of first and second ones of the plurality of predefined play patterns, the first selected predefined play pattern being different from the second selected predefined play pattern; and
automatically assembling, by the computing device, the plurality of audio file pairs into a single audio sequence after the selections have both been received, the single audio sequence comprising a first round followed without user intervention by a second round, the first round comprising the plurality of audio file pairs ordered in accordance with the play order of the first selected predefined play pattern, the second round comprising the plurality of audio file pairs ordered in accordance with the play order of the second selected predefined play pattern, the plurality of audio file pairs in at least one of the first and second rounds being also ordered in accordance with the predefined pair order.

15. The method of claim 14 wherein the single audio sequence is contained in a single audio file.

16. The method of claim 14 wherein each of the plurality of predefined play patterns identifies a play tempo.

17. The method of claim 14 wherein each of the plurality of predefined play patterns identifies audio content of a pause file to be played between the successive audio content in the play order of the predefined play pattern.

18. The method of claim 14 wherein each of the plurality of predefined play patterns identifies audio content of an emphasis file to be placed by the audio sequence assembler before each of the plurality of audio file pairs in the predefined pair order.

19. The method of claim 14 wherein each of the plurality of predefined play patterns indicates how many times the audio content of the first audio file and how many times the audio content of the second audio file is to be played, and
   the plurality of predefined play patterns include a third play pattern indicating that the audio content of the first audio file is to be played for a total of one time, and a fourth play pattern indicating that the audio content of the first audio file to be played for a total of more than one time for the first round of play of the audio file pair.

20. The method of claim 19 wherein the third play pattern is one of the first play pattern and the second play pattern.

21. The method of claim 20 wherein the fourth play pattern is one of the first play pattern and the second play pattern, and the fourth play pattern is different from the third play pattern.

22. The method of claim 14, further comprising:
   initiating playback of the single audio sequence, wherein automatically assembling the plurality of audio file pairs into the single audio sequence comprises fully assembling the single audio sequence before playback of the single audio sequence is initiated.

\* \* \* \* \*